United States Patent
Aoyama

(10) Patent No.: US 7,596,273 B2
(45) Date of Patent: Sep. 29, 2009

(54) IMAGE PROCESSING METHOD, IMAGE PROCESSING APPARATUS, AND IMAGE PROCESSING PROGRAM

(75) Inventor: Tatsuya Aoyama, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 802 days.

(21) Appl. No.: 11/108,769

(22) Filed: Apr. 19, 2005

(65) Prior Publication Data

US 2005/0232492 A1 Oct. 20, 2005

(30) Foreign Application Priority Data

Apr. 19, 2004 (JP) .............................. 2004-122529

(51) Int. Cl.
*G06K 9/48* (2006.01)

(52) U.S. Cl. .................. 382/199; 358/3.26; 382/255; 382/298

(58) Field of Classification Search ................ 382/190, 382/199, 203, 232, 266, 255, 298; 358/1.9, 358/3.26

See application file for complete search history.

(56) References Cited

U.S. PATENT DOCUMENTS

| | | | | |
|---|---|---|---|---|
| 5,522,022 A | * | 5/1996 | Rao et al. | 345/440 |
| 5,867,593 A | * | 2/1999 | Fukuda et al. | 382/176 |
| 5,872,864 A | * | 2/1999 | Imade et al. | 382/176 |
| 5,974,195 A | * | 10/1999 | Kawazome et al. | 382/266 |
| 6,185,341 B1 | * | 2/2001 | Ishida et al. | 382/266 |
| 6,373,962 B1 | * | 4/2002 | Kanade et al. | 382/105 |
| 6,493,458 B2 | * | 12/2002 | Yasui et al. | 382/104 |
| 6,594,375 B1 | * | 7/2003 | Kato et al. | 382/107 |
| 7,092,584 B2 | * | 8/2006 | Perlmutter et al. | 382/294 |
| 7,277,557 B2 | * | 10/2007 | Ihara | 382/100 |
| 7,324,247 B2 | * | 1/2008 | Nishida | 358/540 |
| 7,356,254 B2 | * | 4/2008 | Aoyama | 396/147 |
| 2002/0085116 A1 | * | 7/2002 | Kuwano et al. | 348/465 |
| 2003/0002746 A1 | | 1/2003 | Kusaka | |
| 2003/0128280 A1 | * | 7/2003 | Perlmutter et al. | 348/222.1 |
| 2003/0198398 A1 | * | 10/2003 | Guan et al. | 382/255 |
| 2005/0232492 A1 | * | 10/2005 | Aoyama | 382/199 |
| 2005/0243350 A1 | * | 11/2005 | Aoyama | 358/1.9 |
| 2006/0078218 A1 | * | 4/2006 | Igarashi | 382/255 |
| 2006/0132629 A1 | * | 6/2006 | Tsuruoka | 348/280 |
| 2008/0309777 A1 | * | 12/2008 | Aoyama | 348/222.1 |

FOREIGN PATENT DOCUMENTS

| | | | |
|---|---|---|---|
| JP | 7-121703 A | | 5/1995 |
| JP | 08-331400 | * | 12/1996 |

* cited by examiner

*Primary Examiner*—Gregory M Desire
(74) *Attorney, Agent, or Firm*—Birch, Stewart, Kolasch & Birch, LLP

(57) ABSTRACT

Edges are efficiently extracted from digital photographic images. A reduction rate determining means determines reduction rates for images, such that larger images are assigned higher reduction intensities. A reduction executing means reduces an image, employing the reduction rate determined by the reduction rate determining means, to obtain a reduced image. An edge detecting means extracts edges in eight directions from the reduced image. Coordinate positions of the edges in each directions are obtained, and output to an edge profile generating means.

33 Claims, 16 Drawing Sheets

EDGE PROFILE

HISTOGRAM OF EDGE WIDTHS

IMAGE PROCESSING METHOD, IMAGE PROCESSING APPARATUS, AND IMAGE PROCESSING PROGRAM

BACKGROUND OF THE INVENTION

1. Field of the Invention

The present invention relates to an image processing method, an image processing apparatus, and an image processing program, for extracting edges from digital photographic images, and for obtaining edge data that represents the states of edges within the digital photographic images.

2. Description of the Related Art

Digital photographic images are obtained by photoelectrically reading out photographic images, which are recorded on photographic films, such as negative films and reversal films, using readout apparatuses, such as scanners. Digital photographic images are also obtained by photography using digital still cameras (DSC's). Various image processes are administered on the digital photographic images to display and print them. A blurred image correcting process, for removing blur from blurred images, is an example of such an image process.

There are two types of blurred images. One is focus blur, which is caused by out of focus photography of a subject. The other is shake blur, which is caused by a photographer's hand moving during photography of a subject. In the case of focus blur, point images spread two dimensionally, that is, the spread within the photographic image is non directional. In the case of shake blur, point images spread along a one dimensional trajectory, that is, the spread within the photographic image is directional.

Various methods have been proposed to correct blurred images in the field of digital photographic images. If data, such as the direction of blur and the blur width, are known at the time of photography, it is possible to perform correction by applying correcting filters, such as Wiener filters and reverse filters. Based on this fact, a method for performing blur correction has been proposed in U.S. Patent Application Publication No. 20030002746. In this method, a device (an accelerometer, for example), which is capable of obtaining data, such as the direction of blur and the blur width, during photography is provided on a photography apparatus. Data, such as the blur direction and the blur width, is obtained simultaneously with photography, and correction is performed, based on the obtained data.

There is another known method for correcting blur, as disclosed in Japanese Unexamined Patent Publication No. 7(1995)-121703. In this method, deterioration functions are set for blurred images (images that contain blur), and the blurred images are corrected using a correction filter that corresponds to the set deterioration function. Then, the corrected images are evaluated, and deterioration functions are reset, based on the results of the evaluations. Correction, evaluation, and resetting of the deterioration function is repeated until a desired image quality is obtained.

Meanwhile, accompanying the rapid spread of cellular telephones, the functions thereof have improved. Among these functions, attention is being paid to the advances in functionality of digital cameras built into cellular telephones (hereinafter, simply referred to as "cell phone cameras"). In recent years, the number of pixels of cell phone cameras has increased to millions of pixels, and the cell phone cameras are being utilized in a manner similar to that of regular digital cameras. Not only are commemorative photographs taken on trips with friends, but cell phone cameras are also being used to photograph celebrities and athletes. In view of these circumstances, photographic images obtained by photography using cell phone cameras are not only viewed on monitors of cellular telephones. It is often the case that photographic images obtained by cell phone cameras are printed in the same manner as those obtained by regular digital cameras.

Cell phone cameras are difficult to hold during photography, as the bodies (cellular telephones) thereof are not ergonomically designed specifically for photography. In addition, cell phone cameras have slower shutter speeds compared to regular digital cameras, because they do not have flash photography functions. For these reasons, shake blur is more likely to occur during photography of subjects using cell phone cameras than during photography of subjects using regular digital cameras. Extreme cases of shake blur can be discerned on the monitors of the cell phone cameras, but small shake blurs may not be discerned on the monitors, and only noticed after printing of the images. Therefore, the necessity for blur correction to be administered onto photographic images obtained by photography using cell phone cameras is high.

Miniaturization of cellular telephones is a point of competition for cellular telephone manufacturers, along with the functions and cost thereof. Therefore, it is not realistic to provide a device that obtains blur directions and blur widths within cell phone cameras. Accordingly, the method proposed in U.S. Patent Application Publication No. 20030002746 cannot be applied to cell phone cameras. In addition, the method disclosed in Japanese Unexamined Patent Publication No. 7(1995)-121703 has a problem that the repetition of: setting of the deterioration function; correction; evaluation; and resetting of the deterioration function takes processing time, and therefore is inefficient. Therefore, a blur correcting method may be considered, in which blur data of a digital photographic image (blur direction, blur width and the like) is obtained by analyzing the digital photographic image, correcting parameters are set based on the obtained blur data, and correction is performed employing the set parameters. Blur causes spreading of point images within images. Therefore, spreading of edges corresponding to the spreading of point images is generated in blurred images. That is, the states of the edges within images are directly related to the blur within the images. Utilizing this fact, a method, in which the states of edges within images are analyzed to obtain blur data, then the blur data is employed to perform blur correction, may be considered. This method enables obtainment of blur data from digital photographic images, without providing a specialized device in photography apparatuses. At the same time, correction is performed based on blur data, therefore there is no need to repeat processes, as in the method disclosed in Japanese Unexamined Patent Publication No. 7(1995)-121703, and the method is efficient.

It is necessary to extract edges from digital photographic images, in order to obtain blur data by analyzing the digital photographic images. However, if edges are extracted from digital photographic images in their original sizes, the edge extraction process takes time. In addition, the number of extracted edges will be high, which will cause analysis, which is performed later, to take time as well. Therefore, edges are extracted from reduced images, obtained by administering reduction processes on digital photographic images.

However, the sizes of digital photographic images vary. If large digital photographic images are reduced at the same reduction intensity as that for a small digital photographic image, then edges are extracted from the reduced image obtained thereby, the edge extraction process takes time. In addition, the number of extracted edges will be high, which will cause analysis, which is performed later, to take time as well. These factors cause a problem of inefficiency in processing. On the other hand, if a small digital photographic image is reduced at an reduction intensity suitable for large digital photographic images to shorten processing times, then edges are extracted from the reduced image obtained thereby, the number of extracted edges will be small. Therefore, the accuracy of the analysis, which is performed later, is decreased.

SUMMARY OF THE INVENTION

The present invention has been developed in view of the above circumstances. It is an object of the present invention to provide an image processing method, an image processing apparatus, and an image processing program, which are capable of efficiently extracting edges from digital photographic images regardless of the sizes thereof, during extraction of edges in order to obtain edge data.

The first image processing method of the present invention is an image processing method for extracting edges from digital photographic images and for obtaining edge data that represents the states of the edges, comprising the steps of:

determining reduction intensities according to the sizes of the digital photographic images, such that the reduction intensities are increased for digital photographic images of greater sizes;

administering reduction processes on the digital photographic images, employing the determined reduction intensities, to obtain reduced images; and extracting the edges, from which the edge data is obtained, from the reduced images.

In the present invention, "digital photographic images" include digital images which have been obtained by reading out images from silver salt films or printed matter (photographic prints, for example) by use of readout apparatuses such as scanners, as well as digital images obtained by photographing subjects with digital cameras and the like. Hereinafter, the term "image" will also be used to refer to digital photographic images, for the sake of convenience in description.

In addition, in the present invention, "states of edges" refers to the states of edges within the entirety of each image. The states of edges include edge directions, distributions of the edge directions, edge widths, and distributions of edge widths, within the entirety of each image. For example, as described above, the states of edges within images are related to the blur within the images. Therefore, the states of blur within images can be obtained by obtaining and analyzing the states of the edges, during blur correction processing of the images. For example, there is a high probability that an image is a blurred image if the edge widths therein are wide. Accordingly, judgment regarding whether an image is a blurred image may be performed by extracting edges from the image and analyzing the average width thereof. In addition, by obtaining edge directions and edge widths, if the edge widths of edges in a specific direction are wider than those of edges in other directions, the specific direction may be judged to be a direction of shake blur. The present invention is capable of extracting edges from images and providing edge data for image processes, such as blur correcting processes (including shake blur correcting processes), that require the states of edges within images.

The "sizes of the digital photographic images" may be the number of pixels of image data sets that represent the images.

Note that the subject of the reduction process may be the entirety of the digital photographic images, specific regions within the digital photographic images that include objects, or the central regions of the digital photographic images. The second image processing method of the present invention is an image processing method for extracting edges from digital photographic images and for obtaining edge data that represents the states of the edges, comprising the steps of:

administering reduction processes on the digital photographic images employing a plurality of different reduction intensities, which are incremented in a stepwise manner, to obtain a plurality of first reduced images corresponding to each of the plurality of reduction intensities;

extracting edges from each of the first reduced images;

obtaining the total number of extracted edges from each of the reduced images;

determining at which reduction intensity the total number of edges extracted from the reduced images suddenly decreases, compared to that of a reduced image which was reduced at a reduction intensity of the preceding stepwise increment;

designating either the reduction intensity of the reduced image, in which the total number of extracted edges suddenly decreases, or the reduction intensity of the reduced image, which was reduced at the reduction intensity of the preceding stepwise increment, as a target reduction intensity;

administering a reduction process on the digital photographic images employing the target reduction intensity, to obtain second reduced images; and extracting the edges, from which the edge data is obtained, from the second reduced images.

Note that the subject of the reduction process may be the entirety of the digital photographic images, specific regions within the digital photographic images that include objects, or the central regions of the digital photographic images.

The third image processing method of the present invention is an image processing method for extracting edges from digital photographic images and for obtaining edge data that represents the states of the edges, comprising the steps of:

determining scanning intervals, for extracting edges from the digital photographic images, according to the sizes of the digital photographic images, such that the scanning intervals are increased for digital photographic images of greater sizes; and extracting the edges, from which the edge data is obtained, from the digital photographic images, employing the determined scanning intervals.

The fourth image processing method of the present invention is an image processing method for extracting edges from digital photographic images and for obtaining edge data that represents the states of the edges, comprising the steps of:

extracting edges from the digital photographic images, employing a predetermined preliminary scanning interval;

obtaining the total number of extracted edges from each of the digital photographic images;

determining final scanning intervals, for extracting edges from the digital photographic images, according to the total numbers, such that the final scanning intervals are increased for digital photographic images having greater total numbers of extracted edges; and extracting the edges, from which the edge data is obtained, from the digital photographic images, employing the determined final scanning intervals.

The fifth image processing method of the present invention is an image processing method, for extracting edges from digital photographic images and for obtaining edge data that represents the states of the edges, comprising the steps of:

sequentially extracting edges, from which the edge data is obtained, from portions of the digital photographic images;

calculating a running total of the number of extracted edges; and ceasing extraction of edges when the running total of the number of extracted edges reaches a predetermined threshold value.

Techniques for extracting edges from images include the standard technique of extracting edges from one end of an image to the other. In the case of image processes, such as blur correcting processes, it is desirable to correct a main subject portion, at which a main subject is pictured, such that the image quality of the main subject portion is corrected to a preferred level. Therefore, the states of edges within a main subject portion may be designated as the states of edges within images. Accordingly, a technique in which edges are extracted from the main subject portion of an image may be employed. The main subject portion may be the central portion of images, or a facial portion, which has been detected by a face detection process or the like. The order of the "ordered portions", from which edges are extracted in the fifth image processing method of the present invention, is the order of portions of images, from which edges are extracted by an edge extracting technique.

The first image processing apparatus of the present invention is an image processing apparatus for extracting edges from digital photographic images and for obtaining edge data that represents the states of the edges, comprising:

reduction intensity determining means, for determining reduction intensities according to the sizes of the digital photographic images, such that the reduction intensities are increased for digital photographic images of greater sizes;

reducing means, for administering reduction processes on the digital photographic images, employing the determined reduction intensities, to obtain reduced images; and extracting means, for extracting the edges, from which the edge data is obtained, from the reduced images.

Note that the subject of the reduction process may be the entirety of the digital photographic images, specific regions within the digital photographic images that include objects, or the central regions of the digital photographic images.

The second image processing apparatus of the present invention is an image processing apparatus for extracting edges from digital photographic images and for obtaining edge data that represents the states of the edges, comprising:

stepwise reducing means, for administering reduction processes on the digital photographic images employing a plurality of different reduction intensities, which are incremented in a stepwise manner, to obtain a plurality of first reduced images corresponding to each of the plurality of reduction intensities;

edge extracting means, for extracting edges from each of the first reduced images; and edge obtaining means, for obtaining the total number of extracted edges from each of the reduced images; determining at which reduction intensity the total number of edges extracted from the reduced images suddenly decreases, compared to that of a reduced image which was reduced at a reduction intensity of the preceding stepwise increment; designating either the reduction intensity of the reduced image, in which the total number of extracted edges suddenly decreases, or the reduction intensity of the reduced image, which was reduced at the reduction intensity of the preceding stepwise increment, as a target reduction intensity; administering a reduction process on the digital photographic images employing the target reduction intensity, to obtain second reduced images; and extracting the edges, from which the edge data is obtained, from the second reduced images.

Note that the subject of the reduction process may be the entirety of the digital photographic images, specific regions within the digital photographic images that include objects, or the central regions of the digital photographic images.

The third image processing apparatus of the present invention is an image processing apparatus for extracting edges from digital photographic images and for obtaining edge data that represents the states of the edges, comprising:

scanning interval determining means, for determining scanning intervals, for extracting edges from the digital photographic images, according to the sizes of the digital photographic images, such that the scanning intervals are increased for digital photographic images of greater sizes; and edge extracting means, for extracting the edges, from which the edge data is obtained, from the digital photographic images, employing the determined scanning intervals.

The fourth image processing apparatus of the present invention is an image processing apparatus for extracting edges from digital photographic images and for obtaining edge data that represents the states of the edges, comprising:

edge pre-extracting means, for extracting edges from the digital photographic images, employing a predetermined preliminary scanning interval;

final scanning interval determining means, for obtaining the total number of edges, extracted from each of the digital photographic images by the edge pre-extracting means; and for determining final scanning intervals, for extracting edges from the digital photographic images, according to the total numbers, such that the final scanning intervals are increased for digital photographic images having greater total numbers of extracted edges; and edge extracting means, for extracting the edges, from which the edge data is obtained, from the digital photographic images, employing the determined final scanning intervals.

The fifth image processing apparatus of the present invention is an image processing apparatus for extracting edges from digital photographic images and for obtaining edge data that represents the states of the edges, comprising:

edge extracting means, for sequentially extracting edges, from which the edge data is obtained, from ordered portions of the digital photographic images; and stopping means, for calculating a running total of the number of extracted edges; and for stopping extraction of edges when the running total of the number of extracted edges reaches a predetermined threshold value.

The image processing methods of the present invention may be provided as programs that cause computers to execute the methods. The programs of the present invention may be provided being recorded on computer readable media. Those who are skilled in the art would know that computer readable media are not limited to any specific type of device, and include, but are not limited to: floppy disks, CD's, RAM's, RCM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language, including higher level languages, assembly language, and machine language.

According to the first image processing method and the first image processing apparatus of the present invention, when extracting of edges, reduced images are obtained by reducing larger images at higher reduction intensities. Then, edges are extracted from the reduced images. By extracting edges in this manner, in the case of a large image, edges are extracted from a reduced image obtained by reducing the large image at a high reduction intensity. Therefore, the amount of time necessary to extract edges can be reduced. At the same time, extraction of an excessive number of edges is prevented, thereby reducing the amount of time necessary to analyze the edges. In this manner, the first image processing apparatus of the present invention is efficient. In the case of a small image, edges are extracted from a reduced image obtained by reducing the small image at a reduction intensity lower than that used to reduce the large image (including a reduction intensity of 1, that is, no reduction). Therefore, extraction of an insufficient number of edges is prevented, thereby preventing a decrease in accuracy in the edge analysis process.

Note that only portions of the digital photographic images, such as portions that include specific objects and central portions of the digital photographic images, may be reduced, instead of the entirety of the digital photographic images. In this case, the amount of calculations required and the amount of memory utilized are reduced, which expedites the image processes, causing the apparatus to be more efficient.

According to the second image processing method and the second image processing apparatus of the present invention, a target reduction intensity is determined, by first reducing images employing a plurality of different reduction intensities, which are incremented in a stepwise manner, to obtain a plurality of first reduced images, Then, edges are extracted from each of the first reduced images, and the total number of extracted edges is obtained for each reduced image. FIG. 10 is a graph illustrating an example of the correspondent relationship between total numbers of edges, extracted from reduced images, which have been reduced at reduction rates (inversely proportional to reduction intensities) of ½, ¼, ⅛, and ¹⁄₁₆, and the different reduction rates. As shown in the figure, as the reduction rate decreases, that is, as the reduction intensity increases, the total number of edges decreases, and a sudden drop can be seen at the reduction rate of ¹⁄₁₆. It is considered that the states of the original edges are substantially maintained, in the reduced image corresponding to the reduction rate of the stepwise increment immediately preceding that at which the sudden drop occurs (in the example of FIG. 10, the reduction rate of ⅛). Therefore, this reduction rate is designated as a target reduction rate, and edges are extracted from a reduced image, obtained by reducing the original image at the target reduction rate. Thereby, analysis of the extracted edges will yield the states of the original edges within the image. Meanwhile, in the case of a large image, the states of the original edges are maintained to a certain degree even in a reduced image that corresponds to a reduction rate at which a sudden drop in the total number of edges occurs. Therefore, in cases that high accuracy is not required, a reduction rate at which a sudden drop in the total number of edges occurs may be designated as the target reduction rate (in the example of FIG. 10, the reduction rate of ¹⁄₁₆). If the reduction rate, at which a sudden drop in the total number of edges occurs, is designated as the target reduction rate, instead of the reduction rate of the immediately preceding stepwise increment, the processing time can be shortened. In this manner, the second image processing method and the second image processing apparatus of the present invention is capable of obtaining an appropriate reduction intensity regardless of the sizes of images, and capable of efficiently extracting edges. Further, the processes of obtaining reduced images and extracting edges therefrom are performed during determination of the target intensity. Therefore, the edges, which have been extracted from the reduced images corresponding to each of the reduction intensities, may be recorded in a memory device. Then, after the target reduction intensity is determined, the edges of the reduced image that corresponds to the target reduction intensity can be obtained by reading them out from the memory device, without performing edge extraction again. If this configuration is adopted, the edge extraction process can be further expedited.

Note that only portions of the digital photographic images, such as portions that include specific objects and central portions of the digital photographic images, may be reduced, instead of the entirety of the digital photographic images. In this case, the amount of calculations required and the amount of memory utilized are reduced, which expedites the image processes, causing the apparatus to be more efficient.

According to the third image processing method and the third image processing apparatus of the present invention, scanning intervals for extracting edges from images are determined such that the scanning intervals are increased for images of greater sizes. Therefore, the same advantageous effects as those obtained by the first image processing method and the first image processing apparatus of the present invention can be obtained. At the same time, only the scanning intervals are varied according to the sizes of images. That is, reduction processes need not be performed. Therefore, the edge extraction process can be further expedited.

According to the fourth image processing method and the fourth image processing apparatus of the present invention, first, edges are detected from images employing a predetermined preliminary scanning interval. Then, final scanning intervals are determined such that the final scanning intervals are increased for digital photographic images having greater total numbers of extracted edges, and edges are extracted from images employing the final scanning intervals. Generally, the greater the size of an image, the greater the number of edges therein. The fourth image processing method and the fourth image processing apparatus of the present invention can obtain the same advantageous effects as the preceding methods and apparatuses. Meanwhile, because edges are extracted at scanning intervals, which are determined according to the number of edges within images, appropriate edge extraction can be performed regardless of sizes of images. For example, appropriate edge extraction can be performed from a large image having a small number of edges therein, or from a small image having a great number of edges therein, for example.

According to the fifth image processing method and the fifth image processing apparatus of the present invention, edges are sequentially extracted from ordered portions of images, and edge extraction is ceased when the number of extracted edges reaches a predetermined threshold value. In the case that the image processing method of the present invention is applied to a blur correcting process, for example, blur is present in the entirety of a blurred image. Therefore, the blur can be analyzed for the entire image, from the states of edges of a portion thereof. Particularly in cases that edges are extracted starting from a main subject portion of the image, the states of the edges within the main subject portion are the most important. Therefore, it is desirable to obtain the states of the edges within the main subject portion, and to designate them as the states of edges for the entire image. The fifth image processing method and the fifth image processing apparatus of the present invention takes this point into consideration. Therefore, edges are sequentially extracted from ordered portions of images, and edge extraction is ceased when the number of extracted edges reaches a predetermined threshold value. By obtaining edge data from the edges which have already been extracted, a necessary number of edges can be extracted, while shortening processing time, which is efficient.

DESCRIPTION OF THE PREFERRED EMBODIMENTS

Hereinafter, embodiments of the present invention will be described with reference to the attached drawings.

Figure 1:
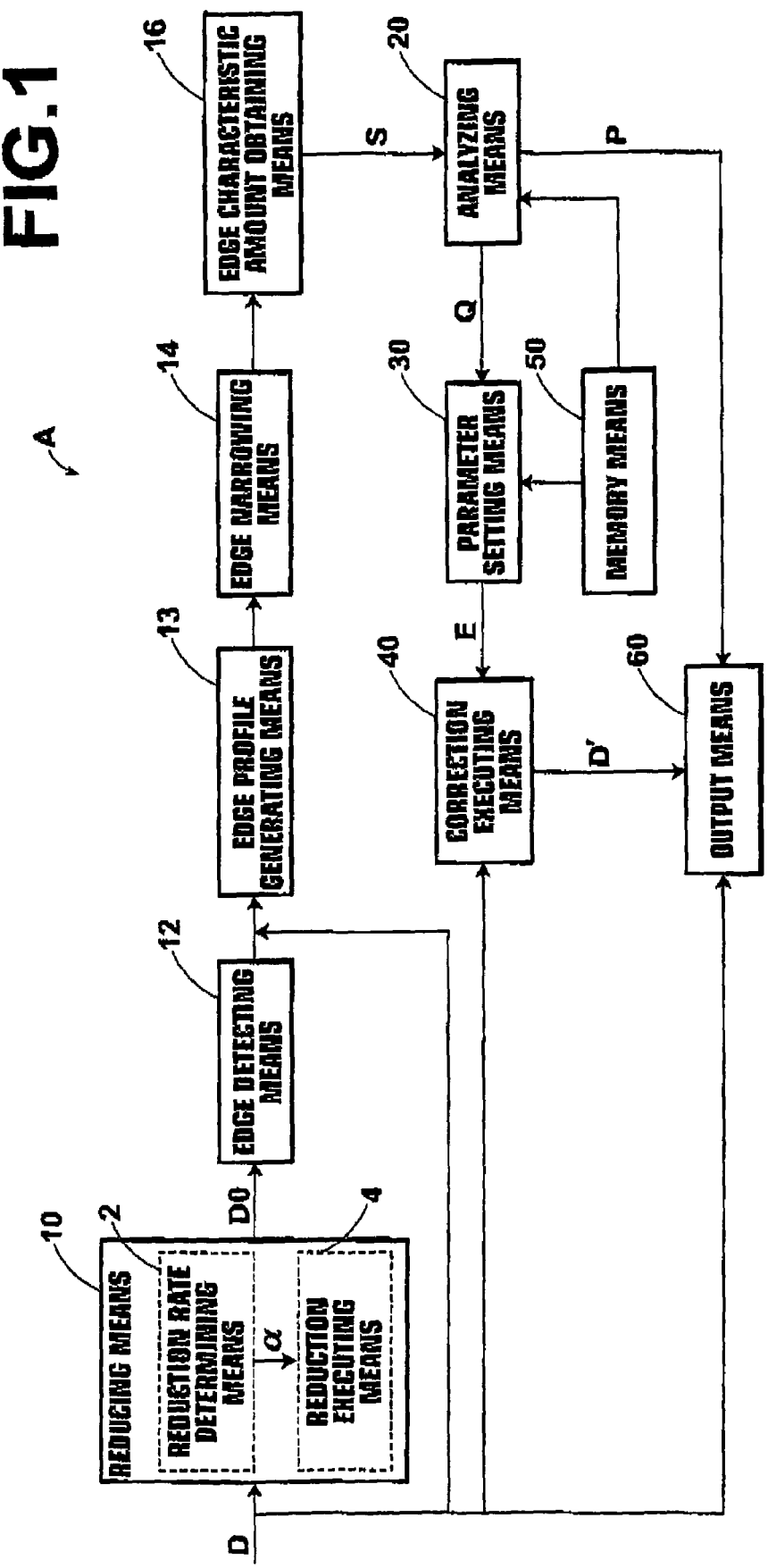
FIG. 1 is a block diagram illustrating the construction of an image processing apparatus according to a first embodiment of the present invention.

FIG. 1 is a block diagram illustrating the construction of an image processing apparatus A, which is the first embodiment of the present invention. Note that the image processing apparatus A performs blur correction processes for correcting blur within digital images (hereinafter, simply referred to as "images"), which are input thereto. The image processing apparatus is realized by executing a blur correction process program, which is recorded in an auxiliary memory device, on a computer (a personal computer, for example). Alternatively, the blur correction process program may be installed on the computer from a recording medium, such as a CD-ROM, on which the program is recorded, or via a network, such as the Internet.

Because image data sets represent images, image data sets and images are not distinguished in the following description.

As illustrated in FIG. 1, the image processing apparatus A of the first embodiment comprises: reducing means 10; edge detecting means 12; edge profile generating means 13; edge narrowing means 14; edge characteristic amount obtaining means 16; analyzing means 20; parameter setting means 30; correction executing means 40; memory means 50; and output means 60. The reducing means 10 administers reduction processes on images D, to obtain reduced images D0. The edge detecting means 12 employs the reduced images D0 to detect edges in each of the eight different directions illustrated in FIG. 2. The edge profile generating means 13 generates profiles of edges detected by the edge detecting means 12. The edge narrowing means 14 removes ineffective edges. The edge characteristic amount obtaining means 16 obtains characteristic amounts S regarding the edges that remain after removal of ineffective edges by the edge narrowing means 14. The analyzing means 20 employs the edge characteristic amounts S to calculate the blur direction and the degree of blur N within the images D, to judge whether an image D is a blurred image or a normal image. In the case that the image D is a normal image, the analyzing means 20 transmits data P, indicating that the image D is a normal image, to the output means 60. In the case that the image D is a blurred image, a degree of shake blur K and a blur width L within the image D are calculated and transmitted, along with a degree of blur N and a blur direction, to the parameter setting means 30 as blur data Q. The parameter setting means 30 sets parameters E for correcting the image D, which is a blurred image. The correction executing means 40 performs correction on the Images D, employing the parameters E, to obtain corrected images D'. The memory means 50 has recorded therein various databases for use by the analyzing means 20 and the parameter setting means 30. The output means 60 outputs the image D in the case that data P, which represents that the image D is a normal image, is received from the analyzing means 20. The output means 60 outputs the corrected image D' in the case that the corrected image D' is received from the correction executing means 40.

The reducing means 10 of the image processing apparatus A of the first embodiment comprises: a reduction rate determining means 2; and a reduction executing means 4. The reduction rate determining means 2 determines reduction rates a according to the sizes of images D. The reduction executing means 4 reduces the images D, employing the reduction rates a determined by the reduction rate determining means 2, to obtain reduced images D0. The reduction rate determining means 2 determines reduction rates such that the reduction intensity increases (that is, the reduction rate decreases) as the sizes of the images D increase. Specifically, reduction rates are determined for images D in the following manner, for example.

1. For images D having sizes of one million pixels or less, the reduction rate $\alpha$ is determined to be 1. That is, the reduction rate $\alpha$ is determined such that reduction is not performed.
2. For images D having sizes greater than one million pixels and two million pixels or less, the reduction rate $\alpha$ is determined to be ½.
3. For images D having sizes greater than two million pixels and three million pixels or less, the reduction rate $\alpha$ is determined to be ¼.

4. For images D having sizes greater than three million pixels and four million pixels or less, the reduction rate α is determined to be ⅛.
5. For images D having sizes greater than four million pixels and six million pixels or less, the reduction rate α is determined to be 1/16.
6. For images D having sizes greater than six million pixels, the reduction rate α is determined to be 1/32.

The reduction executing means 4 employs the reduction rates a determined by the reduction rate determining means 2 in this manner, to reduce the images D to obtain reduced images D0. The obtained reduced images D0 are output to the edge detecting means 12. The edge detecting means 12 detects edges, of intensities greater than or equal to a predetermined intensity, in the eight directions illustrated in FIG. 2 within the reduced images D0. The coordinate positions of these edges are obtained, then output to the edge profile generating means 13.

Figure 2:
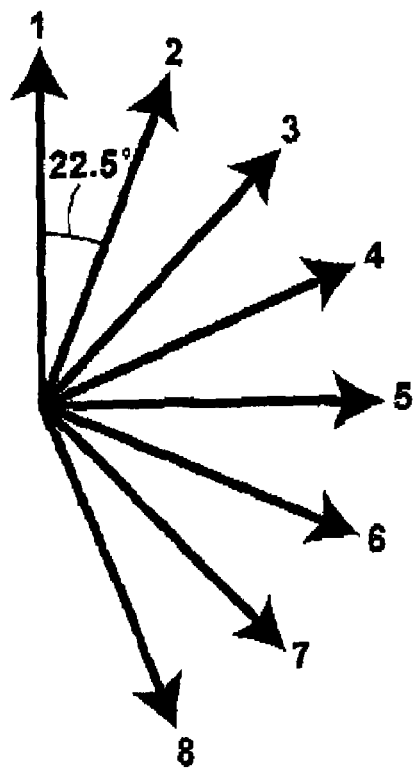
FIG. 2 is a diagram illustrating the directions which are employed during edge detection.

The edge profile generating means 13 generates edge profiles for each of the edges, which have been detected by the edge detecting means 12 in the eight directions illustrated in FIG. 2. The edge profiles are generated employing the images D, based on the coordinate positions of the detected edges, then output to the edge narrowing means 14.

The edge narrowing means 14 removes ineffective edges, based on the edge profiles output thereto from the edge profile generating means 13. Ineffective edges are those that have complex profile shapes, those that include a light source (edges having brightness greater than or equal to a predetermined brightness), and the like. The remaining edge profiles are output to the edge characteristic amount obtaining means 16.

Figure 3:
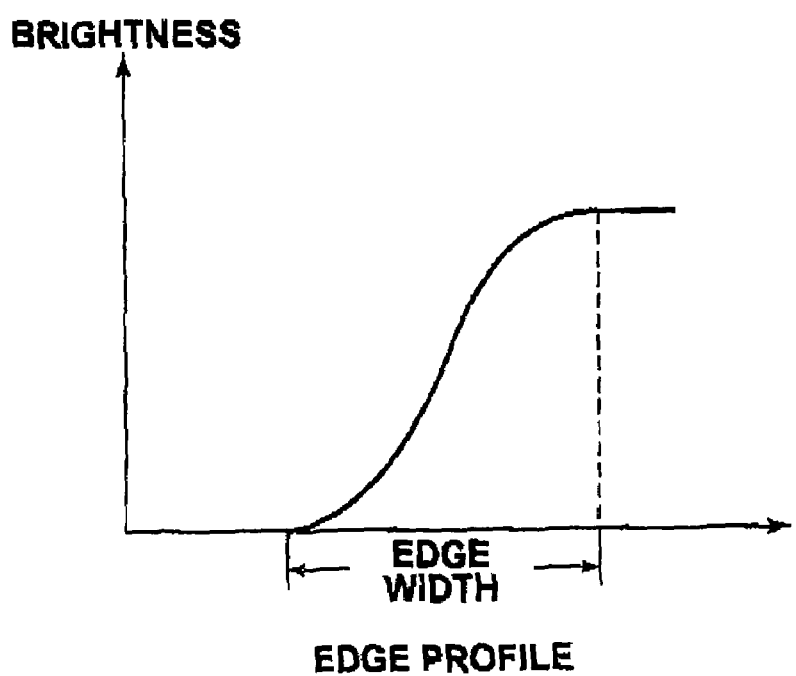
FIG. 3 is a diagram illustrating an edge profile.
Figure 4:
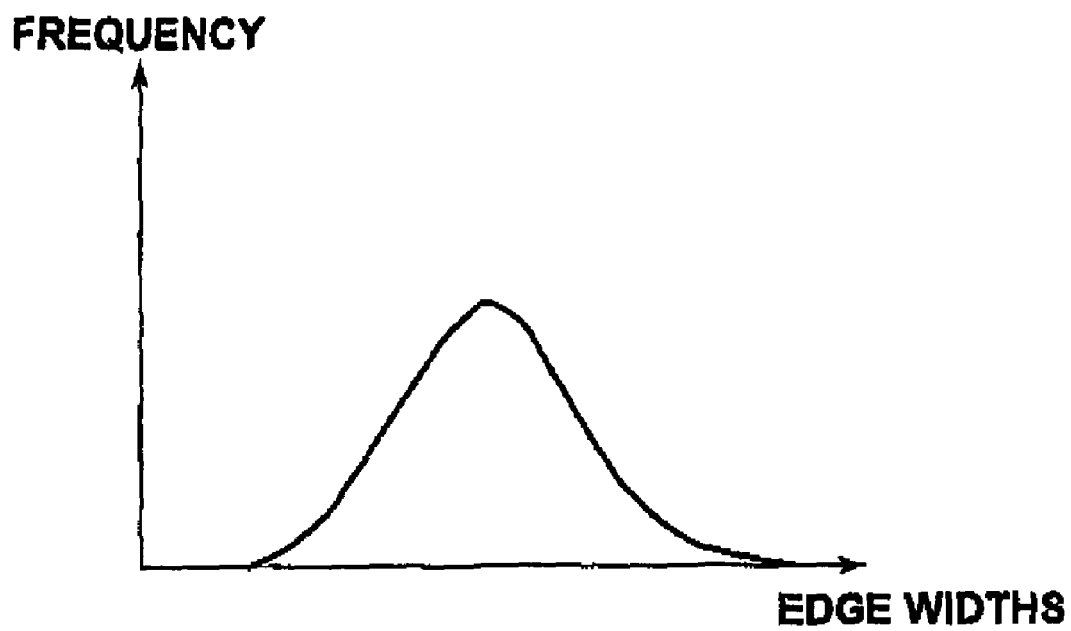
FIG. 4 is a histogram of edge widths.

The edge characteristic amount obtaining means 16 derives edge widths, such as that illustrated in FIG. 3, based on the edge profiles output thereto from the edge narrowing means 14. Then, histograms of the edge widths, such as that illustrated in FIG. 4, are generated for each of the eight directions illustrated in FIG. 2. The histograms are output, along with the edge widths, to the analyzing means 20, as edge characteristic amounts S.

The analyzing means 20 mainly performs the following two processes.
1. Deriving the blur direction and the degree of blur N within images D, to judge whether an image D is a blurred image or a normal image.
2. Calculating blur widths L and shake blur widths K, in the case that the image D is judged to be a blurred image.

The processes will be described, starting with the first process.

Figure 5A:
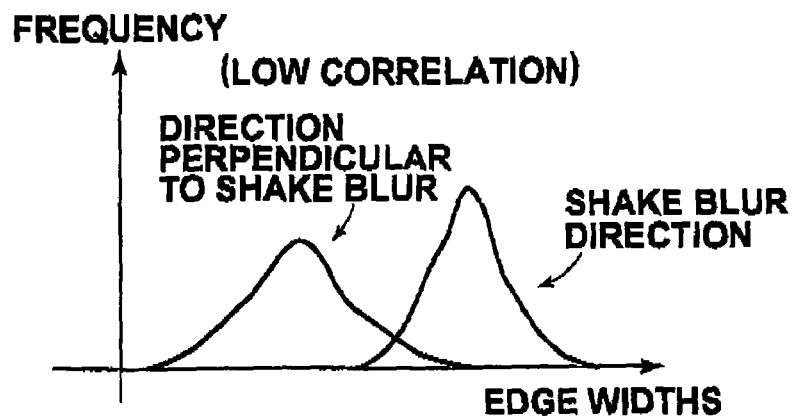
FIGS. 5A, 5B, and 5C illustrate histograms for explaining the operation of an analysis executing means.
Figure 5B:
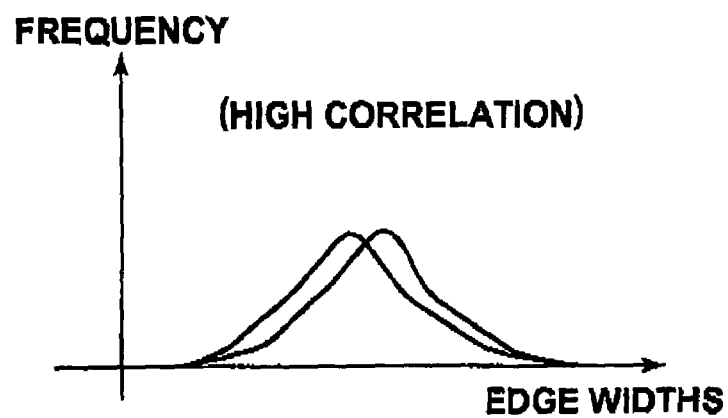

The analyzing means 20 derives the blur direction within images D. First, the histograms of the edge widths in the eight directions illustrated in FIG. 2 (hereinafter, simply referred to as "histograms") are grouped into directional sets, such that directions which are perpendicular to each other are grouped together. Then, the correlative values of the histograms of each directional set (1-5, 2-6, 3-7, and 4-8) are obtained. Note that there are various types of correlative values, depending on the obtainment method. The types can be broadly grouped into those in which correlation is low if the correlative value is high, and those in which correlation is high if the correlative value is high. In the present embodiment, correlative values of the type in which correlation is high if the correlative value is high are employed, as an example. As illustrated in FIG. 5A, in the case that shake blur is present within an image, the correlation between a histogram in the shake blur direction and a histogram in a direction perpendicular to the shake blur direction is low. On the other hand, directional sets of histograms unrelated to the shake blur direction, or directional sets of histograms obtained regarding an image in which there is no shake blur (an image without shake blur, or an image having focus blur) have high correlations, as illustrated in FIG. 5B. The analyzing means 20 of the image processing apparatus according to the first embodiment takes these trends into consideration. The analyzing means 20 obtains correlative values for the four directional sets of histograms, and determines the two directions of the histograms within the directional set having the lowest correlation. If shake blur is present in the image D, one of the two directions can be considered to be the direction closest to the shake blur direction from among the eight directions illustrated in FIG. 2.

Figure 5C:
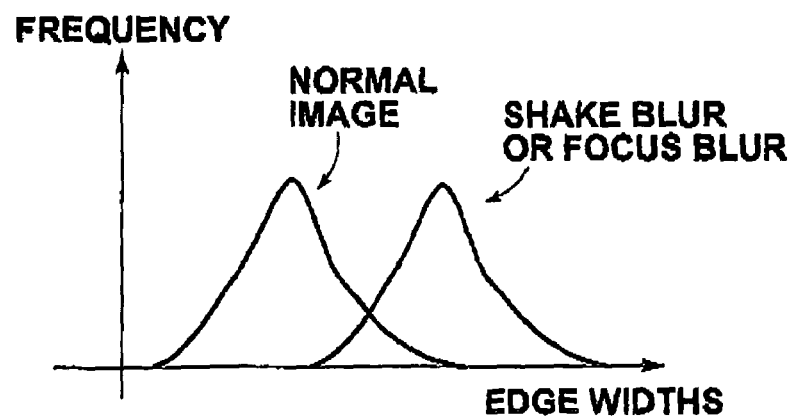

FIG. 5C illustrate histograms obtained from images of the same subject, photographed under different photography conditions. One of the images has been photographed with either focus blur or shake blur, and the other image is a normal image, which has been photographed without any blur. As can be seen from FIG. 5C, the normal image without blur has the smallest average edge width. That is, of the aforementioned two directions, the direction having the larger average edge width should be the direction closest to the shake blur direction.

The analyzing means 20 finds the directional set having the smallest correlation in this manner, and designates the direction having the greater average edge width as the blur direction.

Figure 6:
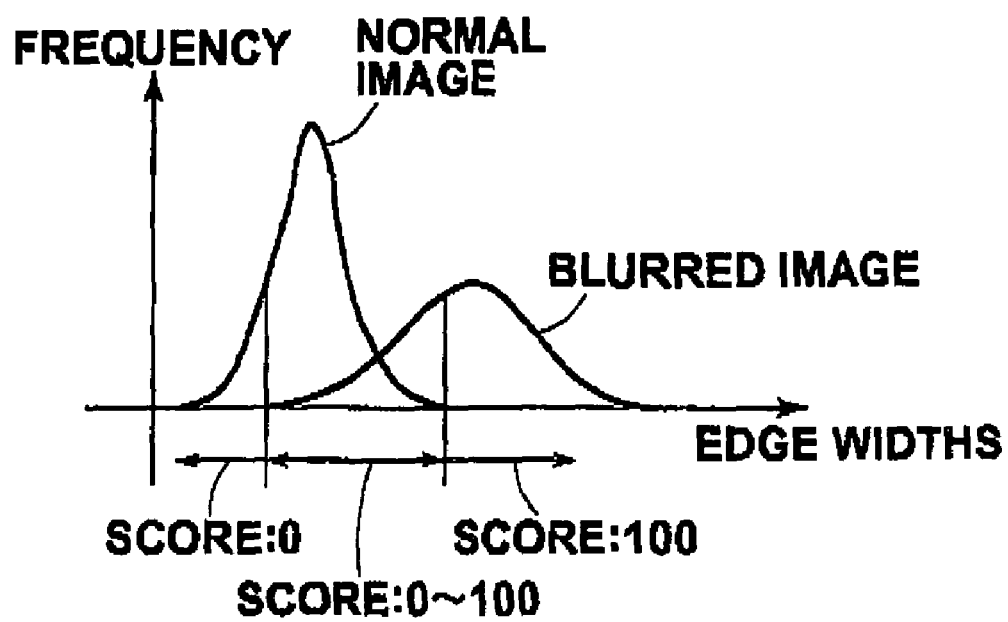
FIG. 6 illustrates a histogram for explaining calculation of a degree of blur.

Next, the analyzing means 20 obtains the degree of blur N within the images D. The degree of blur N represents the degree of blur within images. For example, the average edge width in the most blurred direction within an image (the aforementioned shake blur direction) may be employed as the degree of blur N. However, here, the edge widths of each of the edges in the blur direction are employed to refer to a database, based on FIG. 6, to obtain more accurate results. FIG. 6 illustrates histograms of edge width distributions of edges in the most blurred direction within normal images and blurred (focus blur or shake blur) images. The histogram utilizes normal images and the blurred images, which are recorded in databases of sample images for learning. Ratios of frequencies of edge widths in the blurred images and frequencies of edge widths in the normal images are obtained and designated as evaluation values ("SCORES" in FIG. 6). A database (hereinafter, referred to as "score database"), in which edge widths and scores are correlated, is generated based on FIG. 6. The score database is recorded in the memory means 50. Note that although it is desirable for the "most blurred direction" within the normal images to be directions corresponding to the most blurred direction in the blurred images, any desired direction may be used.

The analyzing means 20 refers to the score database, generated based on FIG. 6 and recorded in the memory means 50, to obtain scores corresponding to the edge widths of each edge in the blur direction within the images D. The scores of all of the edges in the blur direction are averaged, to obtain the degree of blur N within an image D. If the degree of blur N of an image D is less than a predetermined threshold value T, the analyzing means 20 judges the image D to be a normal image. Data P, indicating that the image D is a normal image, is output to the output means 60, and the process ends.

On the other hand, if the degree of blur N within an image D is greater than or equal to the threshold value T, the analyzing means 20 judges that the image D is a blurred image, and initiates the aforementioned second process.

In the second process, the analyzing means 20 first obtains the degree of shake blur K within images D.

The degree of shake blur K, which represents the degree of shake within blurred images, can be obtained based on the following factors.

1. The degree of shake blur is greater in cases that the correlation of the directional set having the smallest correlation (hereinafter, referred to as "minimum correlation set") is lower.

Figure 7A:
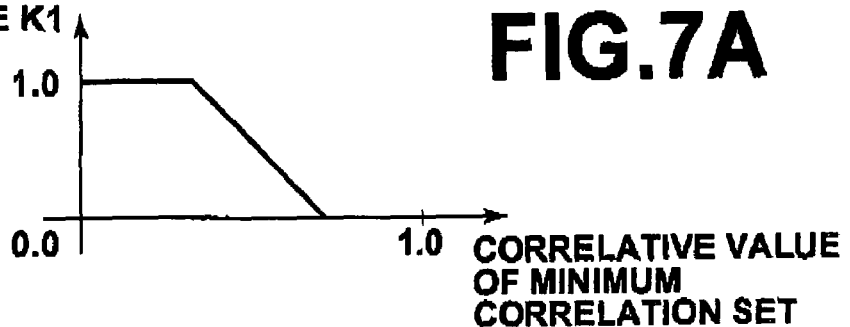
FIGS. 7A, 7B, and 7C illustrate graphs for explaining calculation of a degree of shake blur.

The analyzing means 20 takes this point into consideration, and obtains a first degree of shake blur K1, based on the curve illustrated in FIG. 7A. Note that a look up table (LUT), which has been generated according to the curve of FIG. 7A, is recorded in the memory means 50. The analyzing means 20 obtains the first degree of shake blur K1, by reading out the first degree of shake blur K1, that corresponds to the correlative value of the minimum correlation set, from the memory means 50.

2. The degree of shake blur is greater in cases that the average edge width of the direction, having the greater average edge width of the two directions of the minimum correlation set, is greater.

Figure 7B:
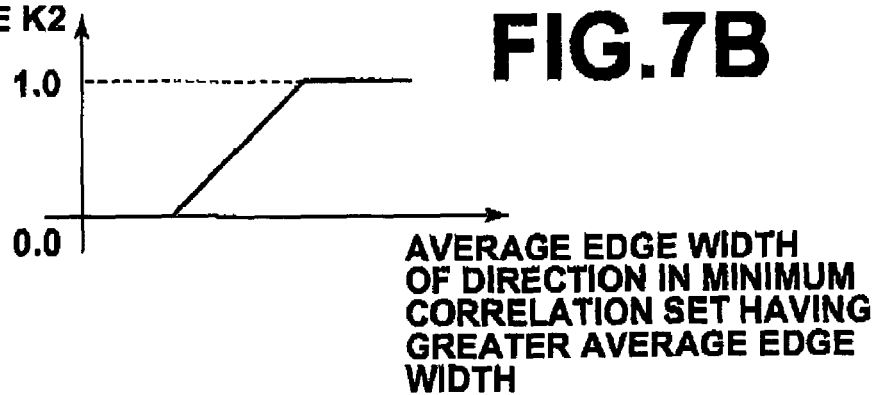

The analyzing means 20 takes this point into consideration, and obtains a second degree of shake blur K2, based on the curve illustrated in FIG. 7B. Note that a look up table (LUT), which has been generated according to the curve of FIG. 7B, is recorded in the memory means 50. The analyzing means 20 obtains the second degree of shake blur K2, by reading out the second degree of shake blur K2, that corresponds to the average edge width of the direction having the greater average edge width of the two directions in the minimum correlation set, from the memory means 50.

3. The degree of shake blur is greater in cases that the difference in average edge widths of the two directions of the minimum correlation set is greater.

Figure 7C:
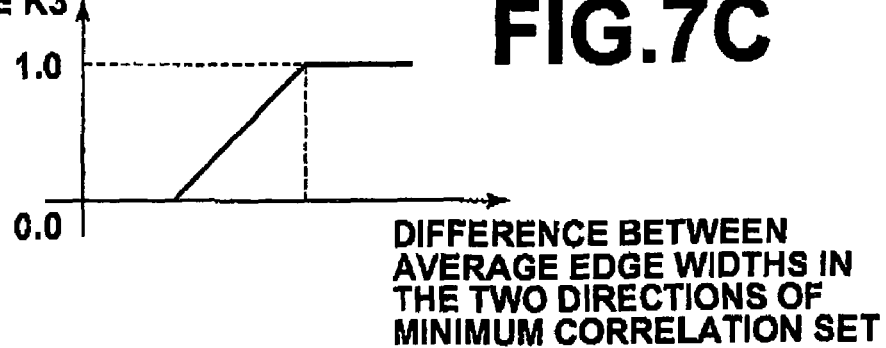

The analyzing means 20 takes this point into consideration, and obtains a third degree of shake blur K3, based on the curve illustrated in FIG. 7C. Note that a look up table (LUT), which has been generated according to the curve of FIG. 7C, is recorded in the memory means 50. The analyzing means 20 obtains the third degree of shake blur K3, by reading out the third degree of shake blur K3, that corresponds to the difference in average edge width of the two directions in the minimum correlation set, from the memory means 50.

The analyzing means 20 obtains the first degree of shake blur K1, the second degree of shake blur K2, and the third degree of shake blur K3 in this manner. The degree of shake blur K within an image D is calculated, employing K1, K2, and K3, according to the following Formula (1).

$$K = K1 \times K2 \times K3 \quad (1)$$

wherein
K: degree of shake blur
K1: first degree of shake blur
K2: second degree of shake blur
K3: third degree of shake blur Next, the analyzing means 20 obtains the blur width L of an image D, which is a blurred image. Here, the average edge width of all of the edges in all eight of the directions illustrated in FIG. 2 may be employed as the blur width L. However, in the present embodiment, the average edge width of edges in the blur direction is employed as the blur width L. Note that in the case that the blur direction is found to be "non-directional", an average edge width of edges in any one direction, or an average edge width of edges in any desired number of directions, may be employed as the blur width L.

The analyzing means 20 obtains the degree of shake blur K and the blur width L of images D, which are blurred images. The degree of shake blur K and the blur width L are transmitted along with the degree of blur N and the blur direction to the parameter setting means 30, as blur data Q.

The parameter setting means 30 sets a one dimensional correction parameter W1 for directional correction and a two dimensional correction parameter W2 for isotropic correction according to Formula (2) below.

$$W1 = N \times K \times M1$$

$$W2 = N \times (1-K) \times M2 \quad (2)$$

wherein
W1: one dimensional correction parameter
W2: two dimensional correction parameter
K: degree of shake blur
M1: one dimensional correction mask
M2: two dimensional correction mask
N: degree of blur That is, the parameter setting means 30 sets the correction parameters W1 and W2 (collectively referred to as parameters E) such that the isotropic correction and the directional correction are weighted more as the degree of blur N is greater, and such that the directional correction are weighted more (while the isotropic correction is weighted less) as the degree of shake blur K is greater.

The parameter setting means 30 outputs the correction parameters E, set in this manner, to the correction executing means 40.

The correction executing means 40 emphasizes high frequency components (designated as Dh) of images D, to correct blur therein. Specifically, blur correction is performed by emphasizing the high frequency components Dh, employing the correction parameters E set by the parameter setting means 125, according to Formula (3) below.

$$D' = D + E \times Dh \quad (3)$$

wherein
D': corrected image
D: image prior to correction
Dh: high frequency components of the image D prior to correction
E: correction parameters The correction executing means 40 performs correction on the images D in this manner, to obtain corrected images D'.

In the case that data P that indicates that an image D is a normal image is received from the analyzing means 20, the output means 60 outputs the image D. In the case that a corrected image D' is received from the correction executing means 40, the output means 60 outputs the corrected image D'. Note that in the first embodiment, "output" by the output means 60 refers to printing to obtain photographic prints. Alternatively, the images D or the corrected images D' may be recorded in recording media, or transmitted to an image storage server on a network, or to a network address specified by a user who requested image correction, and the like.

As described above, according to the image processing apparatus A of the first embodiment, the reduction rate determining means 2 of the reducing means 10 determines reduction rates a for images D, such that larger images D are assigned smaller reduction rates, that is, higher reduction intensities. Then, the reduction executing means 4 reduces the images D, employing the reduction rates α determined by the reduction rate determining means 2. Therefore, in the case of large images, the amount of time required to detect edges can be reduced, and in the case of small images, detection of an insufficient number of edges, due to the reduction rate being too small, can be prevented. In addition, appropriate numbers of edges are provided when the state of blur is analyzed later, employing the detected edges, regardless of the sizes of the images D. Therefore, the state of blur can be analyzed efficiently.

In the above description, reduction processes are administered on the entirety of the images D. However, objects may be detected within the images, and reduced images obtained only of the regions of images that include the objects. An object detecting means may be provided within the reducing means 10, or provided separately, for example. Regions including the objects, of which reduced images are to be obtained, may be specified thereby. As another example, means for receiving input of specific objects within images D from users may be provided within the reducing means 10 or provided separately. Regions including the objects, of which reduced images are to be obtained, may be specified thereby. Then, the reducing means 10 may generate and output reduced images of the specified regions. By adopting this construction, the amount of calculations required and the amount of memory utilized can be reduced, which expedites the image processes, causing the apparatus to be more efficient.

Alternatively, only the central regions of images D may be employed to generate reduced images, instead of employing the entirety of the images D. A means for specifying regions that include the central portions of images may be provided within the reducing means 10 or provided separately, for example. As another example, a means for receiving input of specified regions from users may be provided within the reducing means 10 or provided separately. The central regions of images D may be specified as that which is to be reduced. Then, the reducing means 10 may generate and output reduced images of the central regions. By adopting this construction, the amount of calculations required and the amount of memory utilized can be reduced, which expedites the image processes, causing the apparatus to be more efficient.

Figure 8:
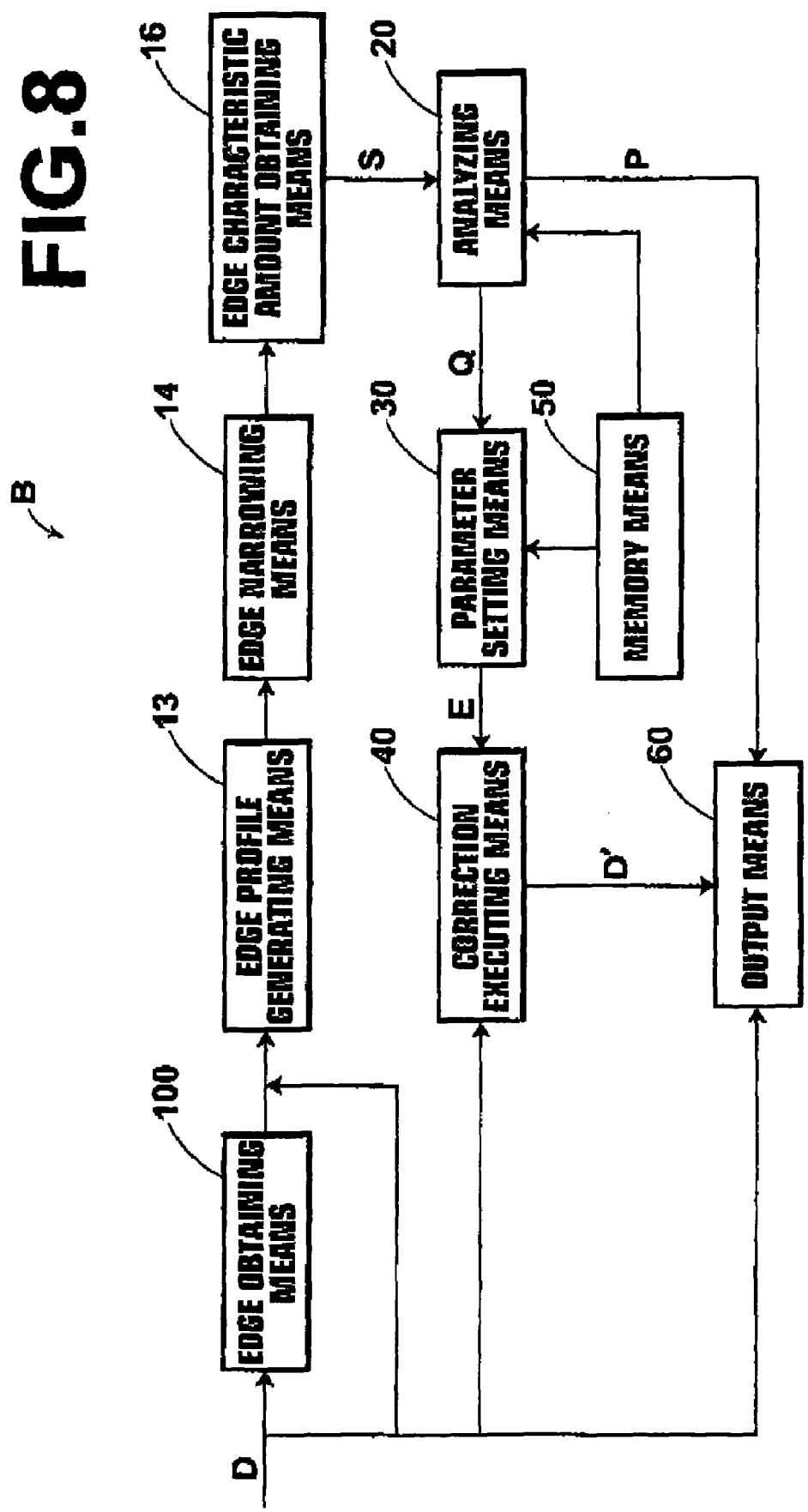
FIG. 8 is a block diagram illustrating the construction of an image processing apparatus according to a second embodiment of the present invention.

FIG. 8 is a block diagram illustrating the construction of an image processing apparatus B, which is a second embodiment of the present invention. Like the image processing apparatus A of FIG. 1, the image processing apparatus B performs blur correction processes for correcting blur within images, which are input thereto.

As illustrated in FIG. 8, the image processing apparatus B according to the second embodiment comprises: edge obtaining means 100; edge profile generating means 13; edge narrowing means 14; edge characteristic amount obtaining means 16; analyzing means 20, parameter setting means 30; correction executing means 40; memory means 50; and output means 60. The edge obtaining means 100 obtains edges from images D. The edge profile generating means 13 generates profiles of edges detected by the edge detecting means 12. The edge narrowing means 14 removes ineffective edges. The edge characteristic amount obtaining means 16 obtains characteristic amounts S regarding the edges that remain after removal of ineffective edges by the edge narrowing means 14. The analyzing means 20 employs the edge characteristic amounts S to calculate the blur direction and the degree of blur N within the images D, to judge whether an image D is a blurred image or a normal image, In the case that the image D is a normal image, the analyzing means 20 transmits data P, indicating that the image D is a normal image, to the output means 60. In the case that the image D is a blurred image, a degree of shake blur K and a blur width L within the image D are calculated and transmitted, along with a degree of blur N and a blur direction, to the parameter setting means 30 as blur data Q. The parameter setting means 30 sets parameters E for correcting the image D, which is a blurred image. The correction executing means 40 performs correction on the images D, employing the parameters E, to obtain corrected images D'. The memory means 50 has recorded therein various databases for use by the analyzing means 20 and the parameter setting means 30. The output means 60 outputs the image D in the case that data P, which represents that the image D is a normal image, is received from the analyzing means 20. The output means 60 outputs the corrected image D' in the case that the corrected image D' is received from the correction executing means 40. Note that the image processing apparatus B of the second embodiment differs from the image processing apparatus A of FIG. 1 only in that the edge obtaining means 100 is provided instead of the reducing means 10 and the edge detecting means 12. The other components of the image processing apparatus B correspond to those of the image processing apparatus A of FIG. 1. Therefore, a description will be given only regarding the operation of the edge obtaining means 100, the other components will be denoted with the same reference numerals as those for the components of the image processing apparatus A, and detailed descriptions thereof will be omitted.

Figure 9:
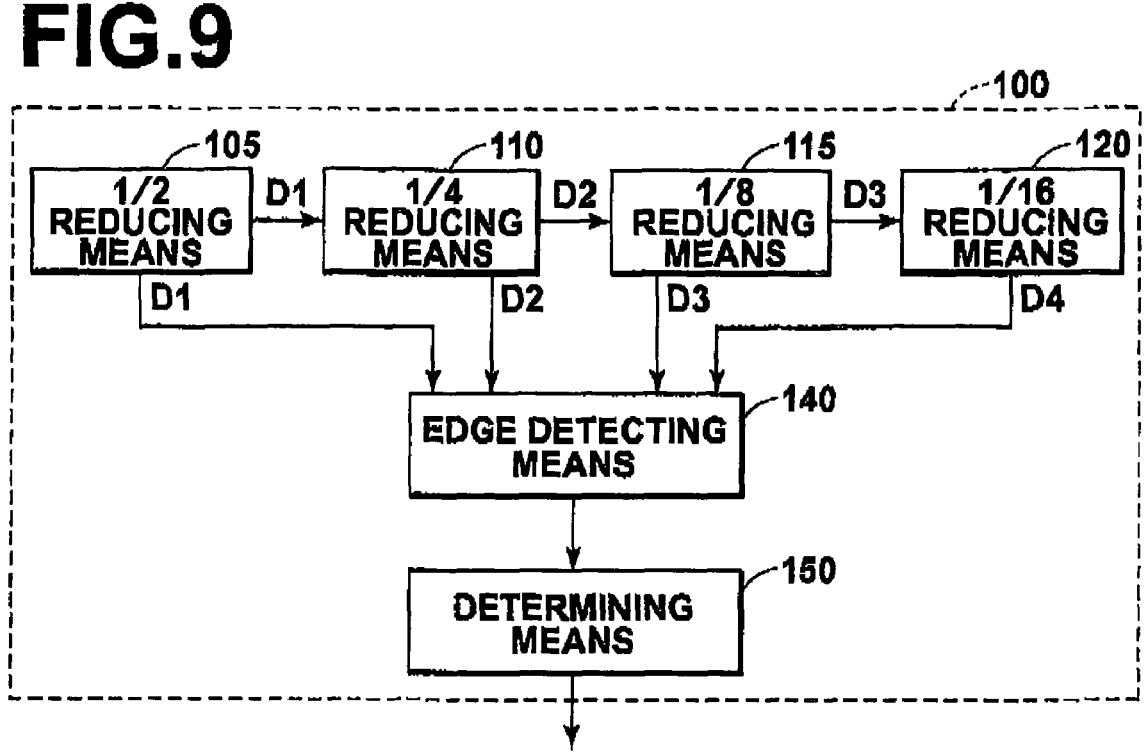
FIG. 9 is a block diagram that illustrates the construction of an edge obtaining means of the image processing apparatus illustrated in FIG. 8

FIG. 9 is a block diagram that illustrates the construction of the edge obtaining means 100 of the image processing apparatus B of the second embodiment illustrated in FIG. 8. As illustrated in FIG. 9, the edge obtaining means 100 comprises: ½ reducing means 105; ¼ reducing means 110, ⅛ reducing means 115; ¹⁄₁₆ reducing means 120; edge detecting means 140; and determining means 150. The ½ reducing means 105 reduces images D at reduction rates of ½, to obtain reduced images D1. The ¼ reducing means 110 reduces the reduced images D1 at reduction rates of ½ (that is, a reduction rate of ¼ with respect to the images D), to obtain reduced images D2. The ⅛ reducing means 115 reduces the reduced images D2 at reduction rates of ½ (that is, a reduction rate of ⅛ with respect to the images D), to obtain reduced images D3. The ¹⁄₁₆ reducing means 120 reduces the reduced images D3 at reduction rates of ½ (that is, a reduction rate of ¹⁄₁₆ with respect to the images D), to obtain reduced images D4. The edge detecting means 140 detects edges from within each of the reduced images D1, D2, D3, and D4. The determining means 150 obtains the total number of edges detected within each of the reduced images. The determining means 150 designates the reduction rate that corresponds to a reduced image, in which the total number of edges suddenly decreases, or the immediately preceding reduction rate, as a target reduction rate. The determining means 150 outputs the edges, which have been detected in the reduced image corresponding to the target reduction rate, to the edge profile generating means 13.

The edge detecting means 140 detects edges, of intensities greater than or equal to a predetermined intensity, in the eight directions illustrated in FIG. 2 within the reduced images D1, D2, D3, and D4, in the same manner as the edge detecting means 12 of the image processing apparatus A of FIG. 1. The coordinate positions of the edges within the reduced images D1, D2, D3, and D4 are also obtained.

Figure 10:
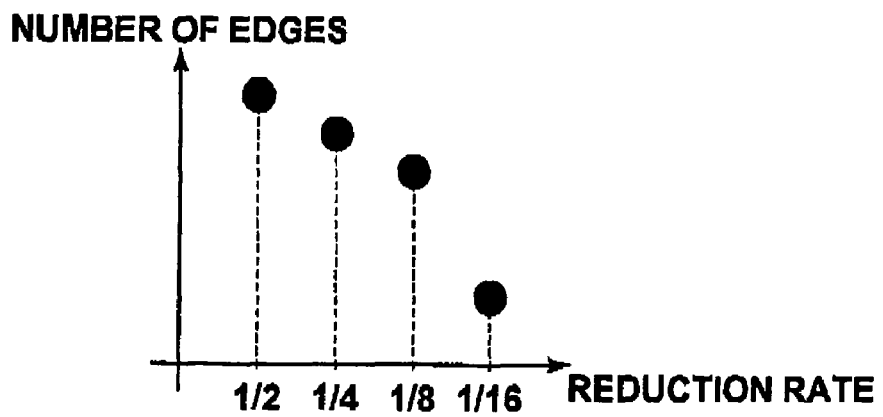
FIG. 10 is a graph illustrating the correspondent relationship between total numbers of edges, obtained by a determining means, and the reduction rates of the reduced images, from which the edges were detected.

The determining means 150 first obtains the total number of edges detected in all of the directions within each of the reduced images D1, D2, D3, and D4 by the edge detecting means 140. FIG. 10 is a graph illustrating the correspondent relationship between total numbers of edges, obtained by the determining means 150, and the reduction rates of the reduced images, from which the edges were detected. As shown in FIG. 10, as the reduction rate decreases, that is, as the reduction intensity increases, the total number of edges decreases. The difference between the number of detected edges at a specific reduction rate (the reduction rate of ¹⁄₁₆ in the example of FIG. 10) and the number of detected edges at the immediately preceding reduction rate (⅛ in this case) is greater than the differences among the other reduction rates. That is, there is a sudden drop in the total number of edges at the reduction rate of 1/16. Hereinafter, reduction rates, at which the number of detected edges drops suddenly, such as the reduction rate of 1/16 in FIG. 10, will be referred to as "sudden drop points".

Here, the reduction rate immediately preceding the sudden drop point may be designated as the target reduction rate. However, in the second embodiment, the target reduction rate is determined based on both the size of an image D and the relationship between the total numbers of edges and the reduction rates specifically, the reduction rate, which is one step higher than the sudden drop point target reduction rate (the reduction rate of ⅛ in the example of FIG. 10), is determined to be the target reduction rate for images that are smaller than or equal to a predetermined threshold size (for example, four million pixels). On the other hand, the sudden drop point is determined to be the target reduction rate for images that are larger than the threshold size.

The determining means 150 determines the target reduction rate in this manner, and outputs the edges extracted from the reduced image corresponding to the target reduction rate to the edge profile generating means 13.

Descriptions of the edge profile generating means 13 and the other components of the image processing apparatus B will be omitted here.

As described above, the image processing apparatus B according to the second embodiment of the present invention determines the reduction rate one step higher than the sudden drop point to be the target reduction rate for small images. Thereby, the problem of excessive reduction of small images precluding correct obtainment of the states of edges therein is prevented. In addition, by determining the sudden drop point to be the target reduction rate for large images, processing time can be shortened, In this manner, appropriate reduction rates can be obtained regardless of the sizes of images, and edges can be efficiently extracted.

In the above description, reduction processes are administered on the entirety of the images D. However, objects may be detected within the images, and reduced images obtained only of the regions of images that include the objects. An object detecting means may be provided within the edge obtaining means 100, or provided separately, for example. Regions including the objects, of which reduced images are to be obtained, may be specified thereby. As another example, means for receiving input of specific objects within images D from users may be provided within the edge obtaining means 100 or provided separately. Regions including the objects, of which reduced images are to be obtained, may be specified thereby. Then, the reducing means 105, 110, 115, and 120 of the edge obtaining means 100 may generate and output reduced images of the specified regions. By adopting this construction, the amount of calculations required and the amount of memory utilized can be reduced, which expedites the image processes, causing the apparatus to be more efficient.

Alternatively, only the central regions of images D may be employed to generate reduced images, instead of employing the entirety of the images D. A means for specifying regions that include the central portions of images may be provided within the edge obtaining means 100 or provided separately, for example. As another example, a means for receiving input of specified regions from users may be provided within the edge obtaining means 100 or provided separately. The central regions of images D may be specified as that which is to be reduced. Then, the reducing means 105, 110, 115, and 120 of the edge obtaining means 100 may generate and output reduced images of the central regions. By adopting this construction, the amount of calculations required and the amount of memory utilized can be reduced, which expedites the image processes, causing the apparatus to be more efficient.

Figure 11:
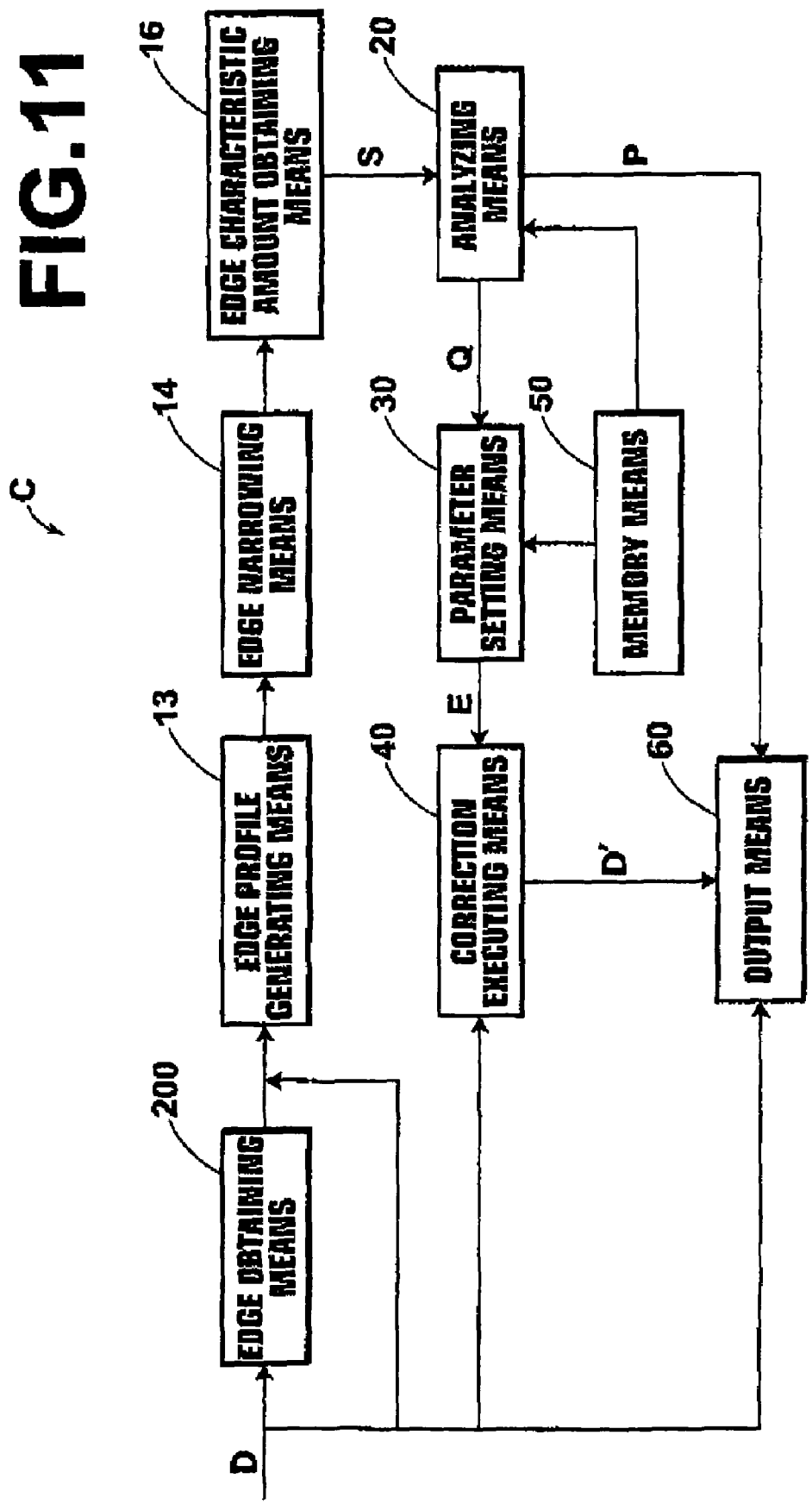
FIG. 11 is a block diagram that illustrates the construction of an image processing apparatus according to a third embodiment of the present invention.

FIG. 11 is a block diagram that illustrates the construction of an image processing apparatus C, which is a third embodiment of the present invention. Like the image processing apparatus A of FIG. 1, the image processing apparatus C performs blur correction processes for correcting blur within images, which are input thereto.

As illustrated in FIG. 11, the image processing apparatus C according to the third embodiment comprises: edge obtaining means 200; edge profile generating means 13; edge narrowing means 14; edge characteristic amount obtaining means 16; analyzing means 20; parameter setting means 30; correction executing means 40, memory means 50; and output means 60. The edge obtaining means 200 obtains edges from images D. The edge profile generating means 13 generates profiles of edges detected by the edge detecting means 12, The edge narrowing means 14 removes ineffective edges. The edge characteristic amount obtaining means 16 obtains characteristic amounts S regarding the edges that remain after removal of ineffective edges by the edge narrowing means 14. The analyzing means 20 employs the edge characteristic amounts S to calculate the blur direction and the degree of blur N within the images D, to judge whether an image D is a blurred image or a normal image. In the case that the image D is a normal image, the analyzing means 20 transmits data P, indicating that the image D is a normal image, to the output means 60. In the case that the image D is a blurred image, a degree of shake blur K and a blur width L within the image D are calculated and transmitted, along with a degree of blur N and a blur direction, to the parameter setting means 30 as blur data Q. The parameter setting means 30 sets parameters E for correcting the image D, which is a blurred image. The correction executing means 40 performs correction on the images D, employing the parameters E, to obtain corrected images D'. The memory means 50 has recorded therein various databases for use by the analyzing means 20 and the parameter setting means 30. The output means 60 outputs the image D in the case that data P, which represents that the image D is a normal image, is received from the analyzing means 20. The output means 60 outputs the corrected image D' in the case that the corrected image D' is received from the correction executing means 40. Note that the image processing apparatus C of the third embodiment differs from the image processing apparatus A of FIG. 1 only in that the edge obtaining means 200 is provided instead of the reducing means 10 and the edge detecting means 12. The other components of the image processing apparatus C correspond to those of the image processing apparatus A of FIG. 1. Therefore, a description will be given only regarding the operation of the edge obtaining means 200, the other components will be denoted with the same reference numerals as those for the components of the image processing apparatus A, and detailed descriptions thereof will be omitted.

Figure 12:
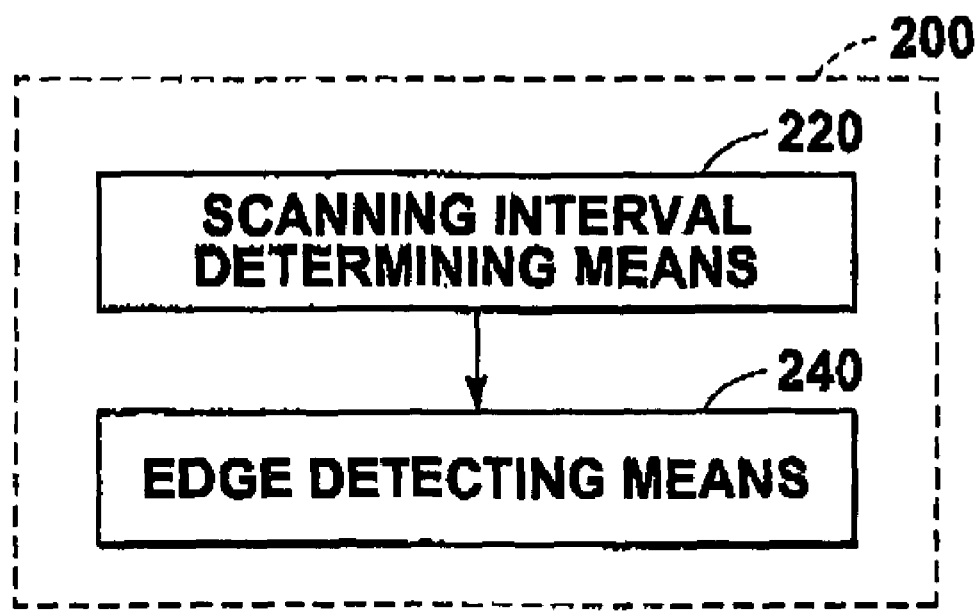
FIG. 12 is a block diagram that illustrates the construction of an edge obtaining means of the image processing apparatus illustrated in FIG. 11.

FIG. 12 is a block diagram that illustrates the construction of the edge obtaining means 200 of the image processing apparatus C of the third embodiment illustrated in FIG. 11. As illustrated in FIG. 12, the edge obtaining means 200 comprises: scanning interval determining means 220; and edge detecting means 240. The scanning interval determining means 220 determines scanning intervals employed by the edge detecting means 240 during extraction of edges, according to the sizes of images D. The edge detecting means 240 extracts edges from the images D, employing the scanning intervals determined by the scanning interval determining means 220. The scanning interval determining means 220 determines scanning intervals such that greater scanning intervals are determined for larger images. Specifically, the scanning intervals are determined in the following manner, for example.

1. For images D having sizes of one million pixels or less, the scanning interval is determined to be a minimum value L1 (a scanning interval that represents full image scanning: 0, for example).
2. For images D having sizes greater than one million pixels and two million pixels or less, the scanning interval is determined to be a scanning interval L2, which is greater than the scanning interval L1.
3. For images D having sizes greater than two million pixels and three million pixels or less, the scanning interval is determined to be a scanning interval L3, which is greater than the scanning interval L2.
4. For images D having sizes greater than three million pixels and four million pixels or less, the scanning interval is determined to be a scanning interval L4, which is greater than the scanning interval L3.
5. For images D having sizes greater than four million pixels and six million pixels or less, the scanning interval is determined to be a scanning interval L5, which is greater than the scanning interval L4.
6. For images D having sizes greater than six million pixels, the scanning interval is determined to be a scanning interval L6, which is greater than the scanning interval L5.

The scanning interval determining means 220 determines the scanning intervals as described above, and provides the determined scanning intervals to the edge detecting means 240. The edge detecting means 240 detects edges, of intensities greater than or equal to a predetermined intensity, in the eight directions illustrated in FIG. 2. The coordinate positions of these edges are obtained, then output to the edge profile generating means 13.

Descriptions of the edge profile generating means 13 and the other components of the image processing apparatus C will be omitted here.

As described above, the image processing apparatus C of the third embodiment employs greater scanning intervals when extracting edges from larger images. Therefore, the same advantageous effects as those obtained by the image processing apparatus A can be obtained. Further, because scanning intervals are changed according to the sizes of images and reduction processes are not performed, processes can be further expedited.

Figure 13:
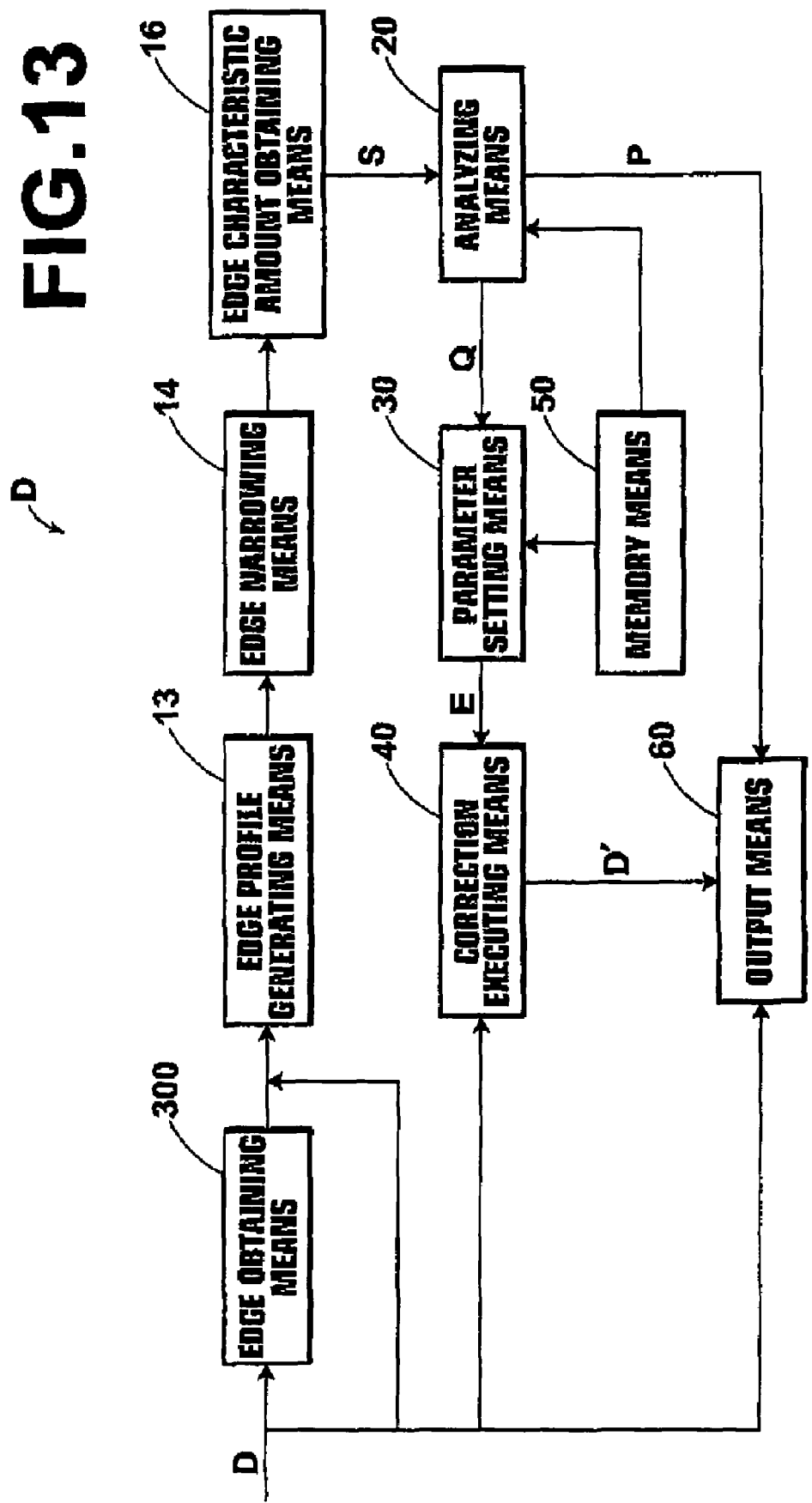
FIG. 13 is a block diagram that illustrates the construction of an image processing apparatus according to a fourth embodiment of the present invention.

FIG. 13 is a block diagram that illustrates the construction of an image processing apparatus D, which is a fourth embodiment of the present invention. Like the image processing apparatus A of FIG. 1, the image processing apparatus D performs blur correction processes for correcting blur within images, which are input thereto.

As illustrated in FIG. 13, the image processing apparatus D according to the fourth embodiment comprises: edge obtaining means 300; edge profile generating means 13; edge narrowing means 14; edge characteristic amount obtaining means 16; analyzing means 20; parameter setting means 30; correction executing means 40; memory means 50; and output means 60. The edge obtaining means 300 obtains edges from images D. The edge profile generating means 13 generates profiles of edges detected by the edge detecting means 12. The edge narrowing means 14 removes ineffective edges. The edge characteristic amount obtaining means 16 obtains characteristic amounts S regarding the edges that remain after removal of ineffective edges by the edge narrowing means 14. The analyzing means 20 employs the edge characteristic amounts S to calculate the blur direction and the degree of blur N within the images D, to judge whether an image D is a blurred image or a normal image. In the case that the image D is a normal image, the analyzing means 20 transmits data P, indicating that the image D is a normal image, to the output means 60. In the case that the image D is a blurred image, a degree of shake blur K and a blur width L within the image D are calculated and transmitted, along with a degree of blur N and a blur direction, to the parameter setting means 30 as blur data Q. The parameter setting means 30 sets parameters E for correcting the image D, which is a blurred image. The correction executing means 40 performs correction on the images D, employing the parameters E, to obtain corrected images D'. The memory means 50 has recorded therein various databases for use by the analyzing means 20 and the parameter setting means 30. The output means 60 outputs the image D in the case that data P, which represents that the image D is a normal image, is received from the analyzing means 20. The output means 60 outputs the corrected image D' in the case that the corrected image D' is received from the correction executing means 40. Note that the image processing apparatus D of the fourth embodiment differs from the image processing apparatus A of FIG. 1 only in that the edge obtaining means 300 is provided instead of the reducing means 10 and the edge detecting means 12. The other components of the image processing apparatus D correspond to those of the image processing apparatus A of FIG. 1. Therefore, a description will be given only regarding the operation of the edge obtaining means 300, the other components will be denoted with the same reference numerals as those for the components of the image processing apparatus A, and detailed descriptions thereof will be omitted.

Figure 14:
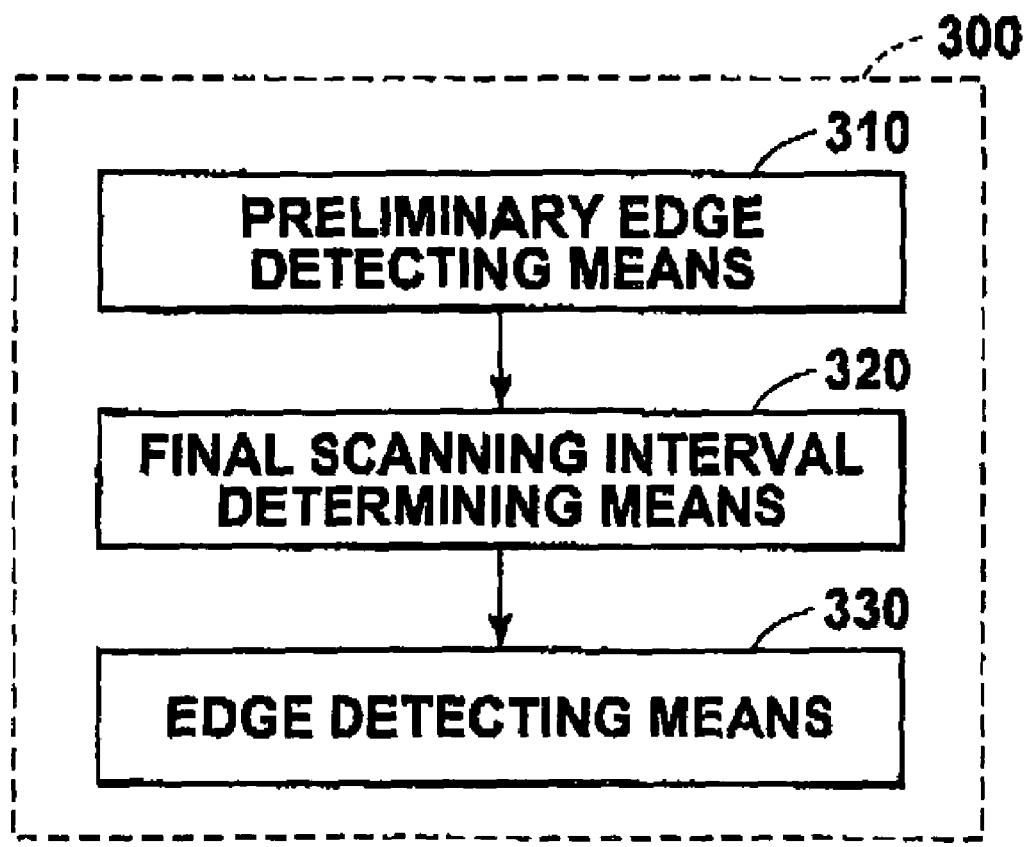
FIG. 14 is a block diagram that illustrates the construction of an edge obtaining means of the image processing apparatus illustrated in FIG. 13.

FIG. 14 is a block diagram that illustrates the construction of the edge obtaining means 300 of the image processing apparatus D of the fourth embodiment, illustrated in FIG. 13. As illustrated in FIG. 14, the edge obtaining means 300 comprises: preliminary edge detecting means 310; final scanning interval determining means 320; and edge detecting means 330. The preliminary edge detecting means 310 extracts edges from images D, employing a preliminary scanning interval. The final scanning interval determining means 320 determines scanning intervals to be employed during edge extraction by the edge detecting means 330, that is, final scanning intervals, according to the total numbers of edges detected by the preliminary edge detecting means 310. The edge detecting means 330 extracts edges from the images D, employing the final scanning intervals determined by the final scanning interval determining means 320.

The preliminary edge detecting means 310 extracts edges from images D employing the preliminary scanning interval, to obtain an estimate of the number of edges within an image D. If a large scanning interval is employed as the preliminary scanning interval, the processing time can be shortened on the other hand, if a small scanning interval is employed as the preliminary scanning interval, the number of edges within the image D can be known more accurately. Therefore, either a large or small scanning interval may be employed as the preliminary scanning interval. In the fourth embodiment, the preliminary edge detecting means 310 employs a large scanning interval (designated as Lmax) as the preliminary scanning interval.

The preliminary edge detecting means 310 extracts edges in the eight directions illustrated in FIG. 2 from images D, employing the preliminary scanning interval Lmax. The final scanning interval determining means 320 obtains the total number of edges detected by the preliminary edge detecting means 310 in eight directions from each of the images D. The final scanning interval determining means 320 also determines the final scanning intervals such that images D having greater total numbers of edges are assigned larger final scanning intervals. Specifically, the final scanning intervals are determined in the following manner, for example.

1. In the case that the total number of edges S is less than or equal to a threshold value S1 (3000, for example), a minimal scanning interval L1 (a scanning interval that represents full image scanning: 0, for example) is assigned as the final scanning interval.
2. In the case that the total number of edges S is greater than the threshold value S1 and less than or equal to a threshold value S2 (S2>S1), a scanning interval L2 (L2>L1) is assigned as the final scanning interval.
3. In the case that the total number of edges S is greater than the threshold value S2 and less than or equal to a threshold value S3 (S3>S2), a scanning interval L3 (L3>L2) is assigned as the final scanning interval.
4. In the case that the total number of edges S is greater than the threshold value S3 and less than or equal to a threshold value S4 (S4>S3), a scanning interval L4 (L4>L3) is assigned as the final scanning interval.
5. In the case that the total number of edges S is greater than the threshold value S4 and less than or equal to a threshold value S5 (S5>S4), a scanning interval L5 (L5>L4) is assigned as the final scanning interval.
6. In the case that the total number of edges S is greater than the threshold value S5, a scanning interval L6 (the preliminary scanning interval Lmax, for example; note that L6>L5) is assigned as the final scanning interval, The final scanning interval determining means 320 determines the final scanning intervals in this manner, and provides the determined final scanning intervals to the edge detecting means 330. The edge detecting means 330 detects edges, of intensities greater than or equal to a predetermined intensity, in the eight directions illustrated in FIG. 2. The coordinate positions of the detected edges are obtained and output to the edge profile generating means 13.

Descriptions of the edge profile generating means 13 and the other components of the image processing apparatus D will be omitted here.

As described above, the image processing apparatus D of the fourth embodiment determines final scanning intervals according to the total number of edges extracted employing the preliminary scanning interval Lmax, such that images having greater numbers of edges are assigned larger scanning intervals. Then, edges are extracted from the images employing the final scanning intervals. Generally, the number of edges increases as the sizes of images increase. Therefore, the same advantageous effects as those obtained by the image processing apparatuses of the preceding embodiments can be obtained by image processing apparatus D of the fourth embodiment. In addition, because edges are extracted employing scanning intervals according to the number of edges within images, appropriate edge extraction can be performed, even from large images having few edges, and from small images having many edges.

Figure 15:
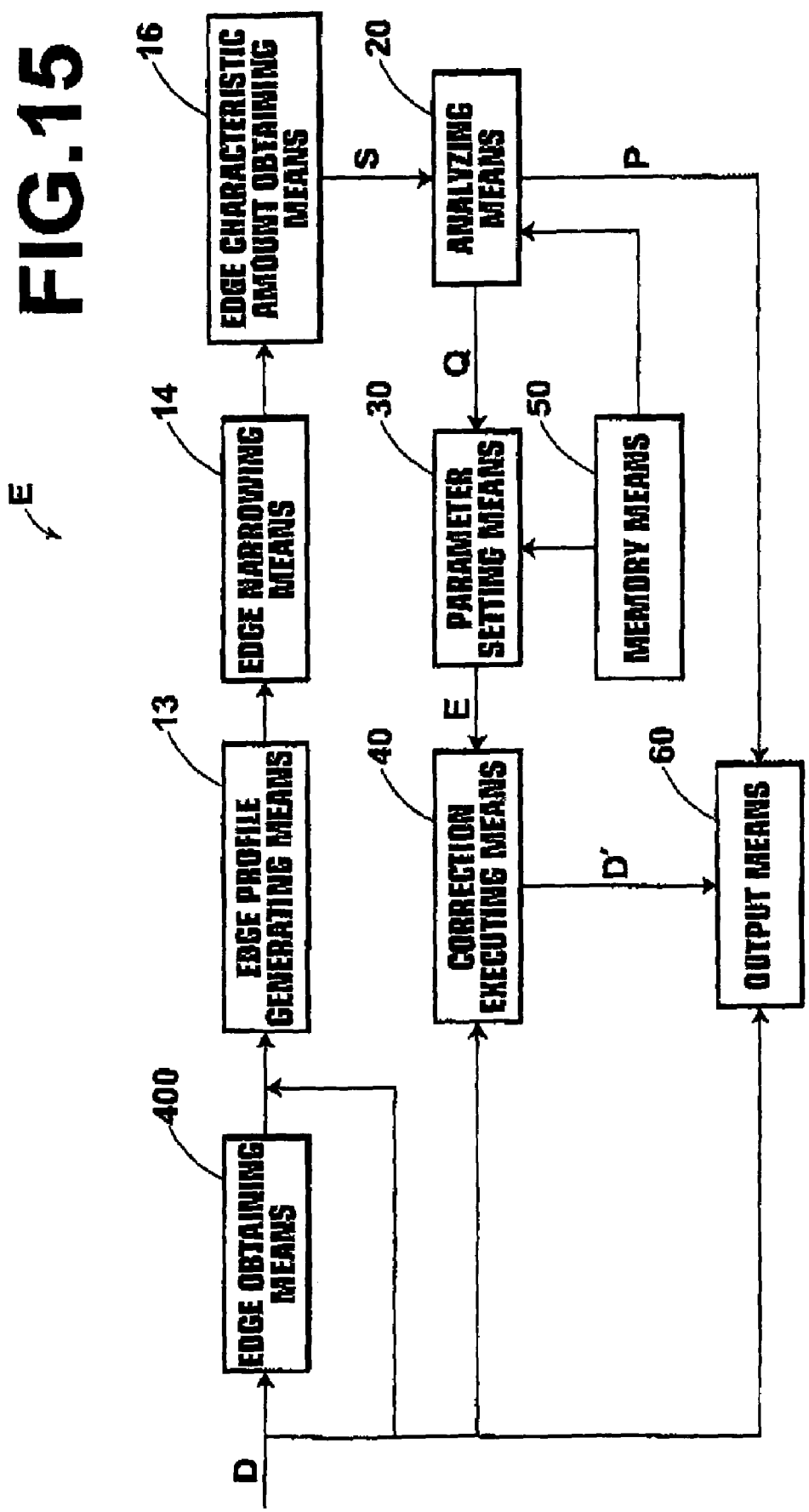
FIG. 15 is a block diagram that illustrates the construction of an image processing apparatus according to a fifth embodiment of the present invention.

FIG. 15 is a block diagram that illustrates an image processing apparatus E, which is a fifth embodiment of the present invention. Like the image processing apparatus A of FIG. 1, the image processing apparatus E performs blur correction processes for correcting blur within images, which are input thereto.

As illustrated in FIG. 15, the image processing apparatus E according to the fifth embodiment comprises: edge obtaining means 400; edge profile generating means 13; edge narrowing means 14; edge characteristic amount obtaining means 16; analyzing means 20; parameter setting means 30; correction executing means 40; memory means 50; and output means 60. The edge obtaining means 400 obtains edges from images D. The edge profile generating means 13 generates profiles of edges detected by the edge detecting means 12. The edge narrowing means 14 removes ineffective edges. The edge characteristic amount obtaining means 16 obtains characteristic amounts S regarding the edges that remain after removal of ineffective edges by the edge narrowing means 14. The analyzing means 20 employs the edge characteristic amounts S to calculate the blur direction and the degree of blur N within the images D, to judge whether an image D is a blurred image or a normal image. In the case that the image D is a normal image, the analyzing means 20 transmits data P, indicating that the image D is a normal image, to the output means 60. In the case that the image D is a blurred image, a degree of shake blur K and a blur width L within the image D are calculated and transmitted, along with a degree of blur N and a blur direction, to the parameter setting means 30 as blur data Q. The parameter setting means 30 sets parameters E for correcting the image D, which is a blurred image. The correction executing means 40 performs correction on the images D, employing the parameters E, to obtain corrected images D'. The memory means 50 has recorded therein various databases for use by the analyzing means 20 and the parameter setting means 30. The output means 60 outputs the image D in the case that data P, which represents that the image D is a normal image, is received from the analyzing means 20. The output means 60 outputs the corrected image D' in the case that the corrected image D' is received from the correction executing means 40. Note that the image processing apparatus E of the fifth embodiment differs from the image processing apparatus A of FIG. 1 only in that the edge obtaining means 400 is provided instead of the reducing means 10 and the edge detecting means 12. The other components of the image processing apparatus E correspond to those of the image processing apparatus A of FIG. 1. Therefore, a description will be given only regarding the operation of the edge obtaining means 400, the other components will be denoted with the same reference numerals as those for the components of the image processing apparatus A, and detailed descriptions thereof will be omitted.

Figure 16:
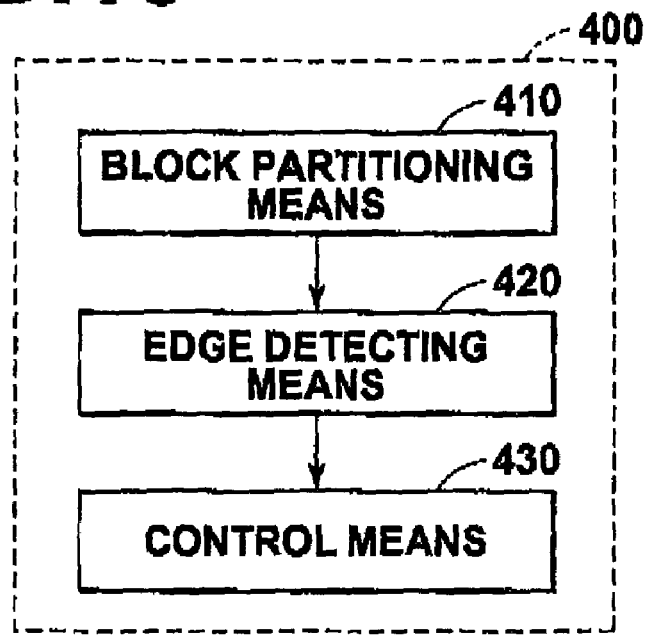
FIG. 16 is a block diagram that illustrates the construction of an edge obtaining means of the image processing apparatus illustrated in FIG. 15.

FIG. 16 is a block diagram that illustrates the construction of the edge obtaining means 400 of the image processing apparatus E of the fifth embodiment, illustrated in FIG. 15. As illustrated in FIG. 15, the edge obtaining means 400 comprises: block partitioning means 410; edge detecting means 420; and control means 430. The block partitioning means 410 partitions an image D into blocks, indicated by broken lines in FIG. 17. The edge detecting means 420 extracts edges from each of the blocks partitioned by the block partitioning means 410, beginning with the center blocks (the blocks surrounded by the bold lines in FIG. 17), in the eight directions illustrated in FIG. 2. The control means 430 calculates a running total of the number of extracted edges, and causes the edge detecting means 420 to cease extraction of edges when the running total reaches a predetermined threshold value (20,000, for example). The control means 430 also outputs the coordinate positions of the edges extracted in each direction to the edge profile generating means 13.

Descriptions of the edge profile generating means 13 and the other components of the image processing apparatus E will be omitted here.

As described above, the image processing apparatus E of the fifth embodiment sequentially extracts edges from ordered portions of images. When the number of extracted edges reaches a predetermined threshold value, edge extraction is ceased, and edge data is obtained from the edges, which have already been extracted. Thereby, a necessary number of edges can be extracted regardless of the sizes of images. IN addition, processing times can be shortened, which is efficient. Note that the image processing apparatus E is applicable to any image process that requires extraction of edges to obtain the states thereof. However, it is desirable that the image processing apparatus E is applied to image processes, in which the states of edges of a portion of an image can be designated as the states of edges for the entire image, such as blur correction of images.

Five embodiments of the present invention have been described above. However, the image processing methods and the image processing apparatuses of the present invention are not limited to being realized independently, and may be realized in combinations. Hereinafter, a sixth embodiment of the present invention, which is a combination of the first and third embodiments, will be described as an example of a combined image processing apparatus.

Figure 18:
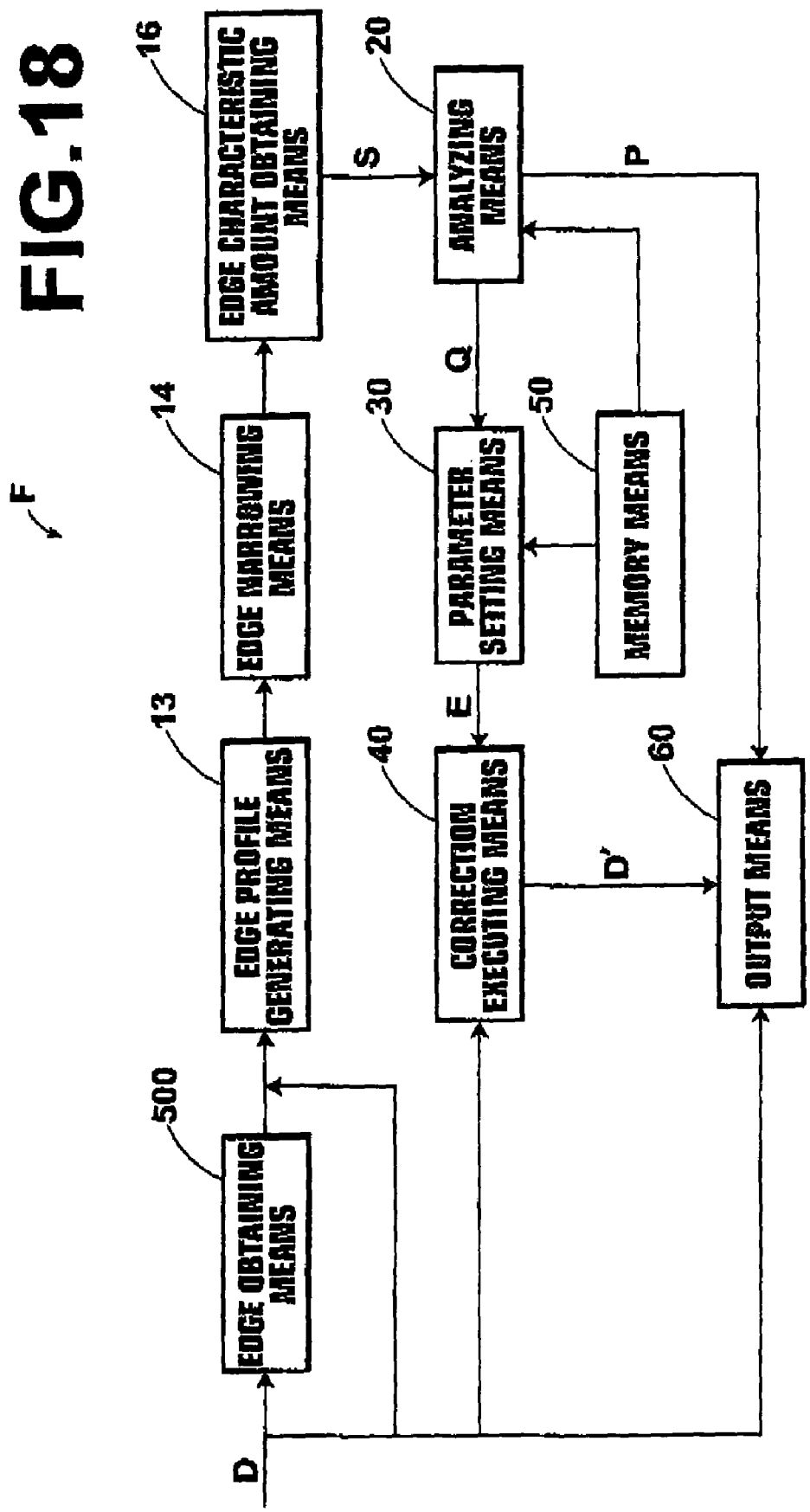
FIG. 18 is a block diagram that illustrates the construction of an image processing apparatus according to a sixth embodiment of the present invention.

FIG. 18 is a block diagram that illustrates the construction of an image processing apparatus F, which is the sixth embodiment of the present invention. Like the image processing apparatuses of the preceding embodiments, the image processing apparatus F performs blur correction processes for correcting blur within images, which are input thereto.

As illustrated in FIG. 18, the image processing apparatus F according to the sixth embodiment comprises; edge obtaining means 500; edge profile generating means 13; edge narrowing means 14; edge characteristic amount obtaining means 16; analyzing means 20; parameter setting means 30; correction executing means 40; memory means 50, and output means 60. The edge obtaining means 400 obtains edges from images D. The edge profile generating means 13 generates profiles of edges detected by the edge detecting means 12. The edge narrowing means 14 removes ineffective edges. The edge characteristic amount obtaining means 16 obtains characteristic amounts S regarding the edges that remain after removal of ineffective edges by the edge narrowing means 14. The analyzing means 20 employs the edge characteristic amounts S to calculate the blur direction and the degree of blur N within the images D, to judge whether an image D is a blurred image or a normal image. In the case that the image D is a normal image, the analyzing means 20 transmits data P, indicating that the image D is a normal image, to the output means 60. In the case that the image D is a blurred image, a degree of shake blur K and a blur width L within the image D are calculated and transmitted, along with a degree of blur N and a blur direction, to the parameter setting means 30 as blur data Q. The parameter setting means 30 sets parameters E for correcting the image D, which is a blurred image. The correction executing means 40 performs correction on the images D, employing the parameters E, to obtain corrected images D'. The memory means 50 has recorded therein various databases for use by the analyzing means 20 and the parameter setting means 30. The output means 60 outputs the image D in the case that data P, which represents that the image D is a normal image, is received from the analyzing means 20. The output means 60 outputs the corrected image D' in the case that the corrected image D' is received from the correction executing means 40. Note that the image processing apparatus F of the sixth embodiment differs from the image processing apparatus A of FIG. 1 only in that the edge obtaining means 500 is provided instead of the reducing means 10 and the edge detecting means 12. The other components of the image processing apparatus F correspond to those of the image processing apparatus A of FIG. 1. Therefore, a description will be given only regarding the operation of the edge obtaining means 500, the other components will be denoted with the same reference numerals as those for the components of the image processing apparatus A, and detailed descriptions thereof will be omitted.

Figure 19:
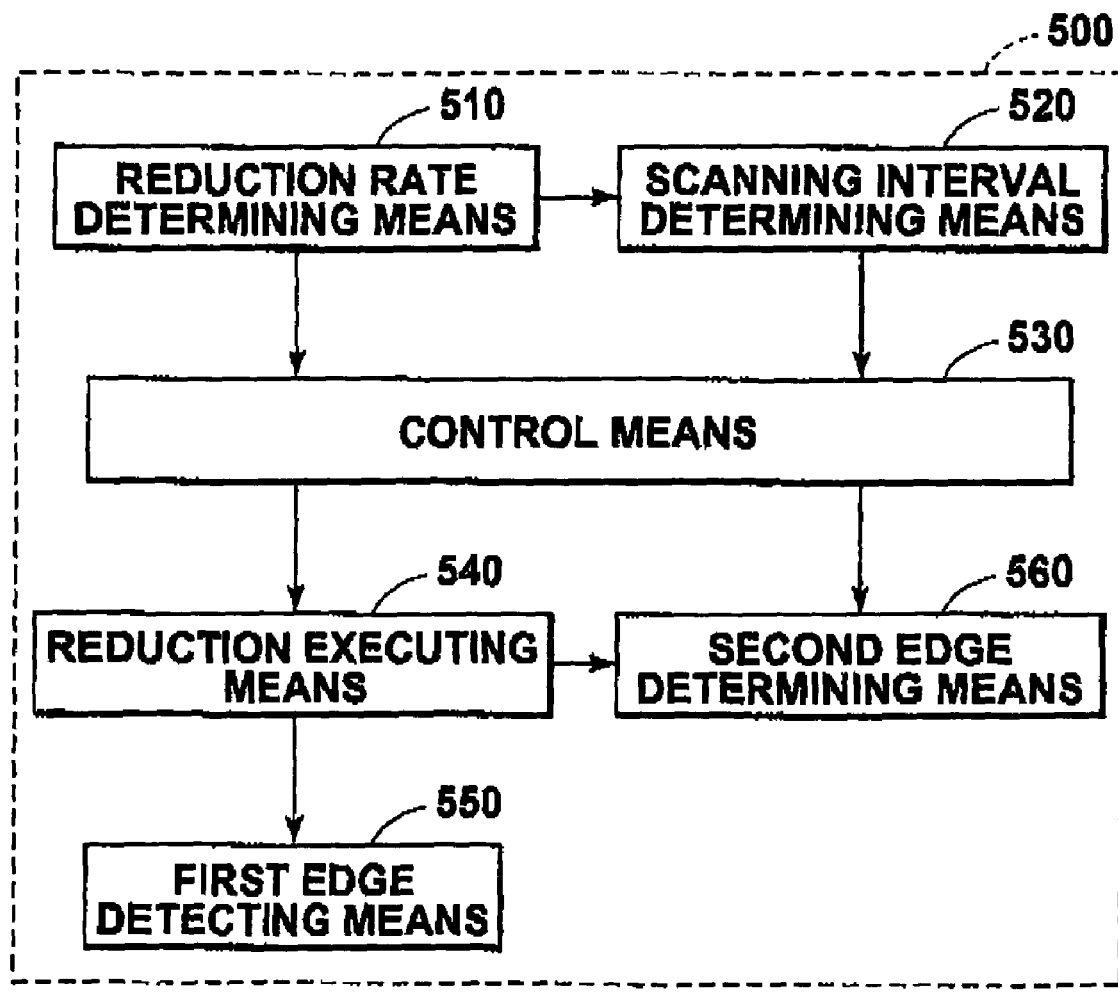
FIG. 19 is a block diagram that illustrates the construction of an edge obtaining means of the image processing apparatus illustrated in FIG. 18.

FIG. 19 is a block diagram that illustrates the construction of the edge obtaining means 500 of the image processing apparatus F according to the sixth embodiment illustrated in FIG. 18. As illustrated in FIG. 19, the edge obtaining means 500 comprises: reduction rate determining means 510; scanning interval determining means 520; control means 530; reduction executing means 540; first edge detecting means 550; and second edge detecting means 560. Hereinafter, each component of the image processing apparatus F will be described. Note that each component of the image processing apparatus F performs its function according to commands from the control means 530.

The reduction rate determining means 510 determines reduction rates according to the sizes of images D, such that the reduction intensity increases (that is, the reduction rate decreases) as the sizes of the images D increase. Specifically, reduction rates are determined for images D in the following manner, for example.

1. For images D having sizes of one million pixels or less, the reduction rate is determined to be 1. That is, the reduction rate α is determined such that reduction is not performed.
2. For images D having sizes greater than one million pixels and two million pixels or less, the reduction rate is determined to be ½.
3. For images D having sizes greater than two million pixels and three million pixels or less, the reduction rate is determined to be ¼.
4. For images D having sizes greater than three million pixels and four million pixels or less, the reduction rate is determined to be ⅛.
5. For images D having sizes greater than four million pixels, the reduction rate is determined to be ⅛ as well.

The control means 530 causes different operations to be performed with respect to images D, which are of sizes less than or equal to four million pixels, and images D, which are of sizes greater than four million pixels. First, a case of an image, which is of a size less than or equal to four million pixels will be described.

The control means 530 causes the reduction executing means 540 to reduce an image D, which is of a size less than or equal to four million pixels, employing the reduction rate determined for the image D by the reduction rate determining means 510. Then, the reduced image obtained by the reduction executing means 540 is output to the first edge detecting means 550. The first edge detecting means 550 extracts edges in the eight directions illustrated in FIG. 2 from the reduced image output thereto from the reduction executing means 540. The coordinate positions of the extracted edges in each direction are obtained and output to the edge profile generating means 13. Note that the first edge detecting means 550 extracts edges by performing full image scanning (that is, the scanning interval is 0) on the reduced image.

On the other hand, the control means 530 causes the reduction executing means 540 to reduce an image D, which is of a size greater than four million pixels, employing the reduction rate determined for the image D by the reduction rate determining means 510 (⅛ in this case). The reduced image obtained by the reduction executing means 540 is output to the second edge detecting means 560, and the scanning interval determining means 520 is caused to determine a scanning interval for the reduced image corresponding to the image D.

The scanning interval determining means 520 sets a scanning interval according to the size of the image D, such that the scanning interval is greater for larger images, and greater than 0. The control means 530 causes the second edge detecting means 560 to extract edges from the reduced image output thereto from the reduction executing means 540 in the eight directions illustrated in FIG. 2, employing the scanning interval determined by the scanning interval determining means. The coordinate positions of the extracted edges in each direction are obtained and output to the edge profile generating means.

Descriptions of the edge profile generating means 13 and the other components of the image processing apparatus F will be omitted here.

As described above, in the image processing apparatus F of the sixth embodiment, the reduction rate determining means 510 determines reduction rates according to the size of an image D, such that larger images are assigned smaller reduction rates, that is, greater reduction intensities, for images D of sizes less than or equal to four million pixels. The reduction executing means 540 reduces the image D, employing the reduction rate determined by the reduction rate determining means 510. The first edge detecting means 550 extracts edges from the reduced image by full image scanning. Therefore, the same advantageous effects as those of the image processing apparatus A according to the first embodiment can be obtained. That is, in the case of large images, the amount of time required to detect edges can be reduced, and in the case of small images, detection of an insufficient number of edges, due to the reduction rate being too small, can be prevented. Meanwhile, excessively high reduction intensities are avoided for an image D of a size greater than four million pixels, and the same reduction rate as that employed for images of sizes in the three to four million pixel range is assigned to the image D. Meanwhile, the scanning interval determining means 520 determines scanning intervals according to the size of the image D, such that larger images are assigned larger scanning intervals. The second edge detecting means 560 extracts edges from the reduced image obtained by the reduction executing means 540, employing the scanning interval determined by the scanning interval determining means 520. Therefore, the same advantageous effects as those obtained by the image processing apparatus C according to the third embodiment can be obtained.

When edges are extracted from reduced images of original images, as the reduction intensity is increases, that is, as the reduction rate decreases, the influence of error in the positions of extracted edges becomes greater. For example, if there is a one pixel error in the position of an edge, extracted from a reduced image, which has been reduced at a reduction rate of ⅛, the position of the edge within the original image will be shifted eight pixels. If there is a one pixel error in the position of an edge, extracted from a reduced image, which has been reduced at a reduction rate of ¹⁄₃₂, the position of the edge within the original image will be shifted 32 pixels. In other words, if the reduction intensity is too high, the influence of edge errors becomes great, and even small errors can adversely affect image processes that follow. The image processing apparatus F according to the sixth embodiment of the present invention avoids assigning excessively high reduction intensities to large images. Large images (images of sizes greater than four million pixels, in this case) are assigned the same reduction rates as those employed for images of sizes in the three to four million pixel range, and reduced images are obtained. Additionally, the scanning interval is adjusted, to improve the efficiency of the processes. Accordingly, the above problem can be solved.

In the above description, reduction processes are administered on the entirety of the images D. However, objects may be detected within the images, and reduced images obtained only of the regions of images that include the objects. An object detecting means may be provided within the edge obtaining means 500, or provided separately, for example. Regions including the objects, of which reduced images are to be obtained, may be specified thereby. As another example, means for receiving input of specific objects within images D from users may be provided within the edge obtaining means 500 or provided separately. Regions including the objects, of which reduced images are to be obtained, may be specified thereby. Then, the reducing means 540 of the edge obtaining means 500 may generate and output reduced images of the specified regions. By adopting this construction, the amount of calculations required and the amount of memory utilized can be reduced, which expedites the image processes, causing the apparatus to be more efficient.

Alternatively, only the central regions of images D may be employed to generate reduced images, instead of employing the entirety of the images D. A means for specifying regions that include the central portions of images may be provided within the edge obtaining means 500 or provided separately, for example. As another example, a means for receiving input of specified regions from users may be provided within the edge obtaining means 500 or provided separately. The central regions of images D may be specified as that which is to be reduced. Then, the reducing means 540 of the edge obtaining means 500 may generate and output reduced images of the central regions. By adopting this construction, the amount of calculations required and the amount of memory utilized can be reduced, which expedites the image processes, causing the apparatus to be more efficient.

The preferred embodiments of the present invention have been described above. However, the image processing method, the image processing apparatus, and the image processing program of the present invention are not limited to the above embodiments. Various modifications are possible, as long as they do not depart from the spirit of the present invention.

For example, in the image processing apparatus A of FIG. 1, the reduction rate determining means 2 determines the reduction rate according to the size of an image D, and the reduction executing means 4 reduces the image D employing the determined reduction rate. Alternatively, the size of reduced images, for analyzing the states of edges within images D, may be set to a uniform size, one million pixels, for example. The reduction rates for images of all sizes may be determined such that the reduction process yields a reduced image of the uniform size. As a result, larger images will be reduced with higher reduction intensities. Therefore, it can be said that images are reduced employing reduction rates according to the sizes thereof, albeit indirectly.

Figure 17:
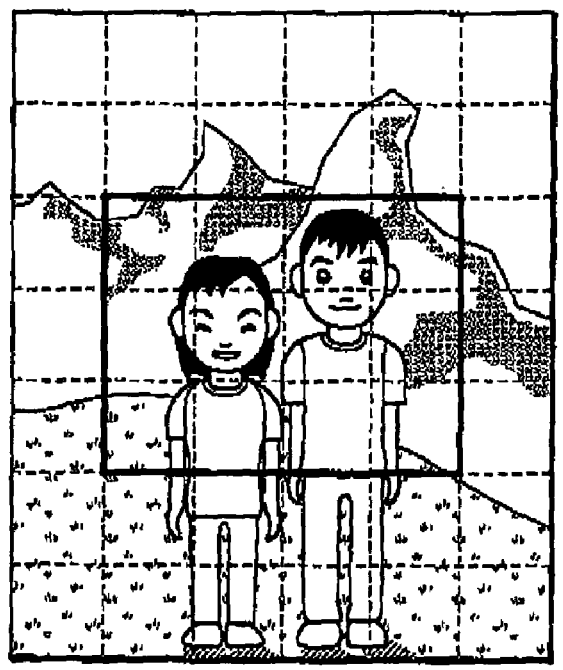
FIG. 17 is a diagram for explaining the operation of the edge obtaining means illustrated in FIG. 16.

In the image processing apparatus E of FIG. 15, the edge obtaining means 400 partitions an image D into the blocks illustrated in FIG. 17, and sequentially extracts edges from the blocks, starting with the blocks at the center of the image D. Alternatively, a main subject, a facial portion, for example, may be detected from within the image, and edges may be sequentially extracted, starting with the block that contains the main subject. Of course, edges may be extracted from one end of the image to the other, from the upper left corner to the lower right corner of the image illustrated in FIG. 17, for example, as in standard edge extracting techniques.

Neither the technique by which blur within images is analyzed based on extracted edges, nor the technique by which blur is corrected based on the analysis results, is limited to those employed by the image processing apparatuses of the above embodiments.

The image processing method, the image processing apparatus, and the image processing program of the present invention is not limited to extracting edges for analyzing blur within images. The present invention may be applied to any image process that requires obtainment of edge data that represents the states of edges, by extracting the edges. Specifically, the present invention may be applied to image processes, such as correction processes, administered by cell phone cameras, digital cameras, and printers, for example.

In the above embodiments, when determining reduction rates according to the sizes of images, that is, the numbers of pixels therein, ½, ¼, ⅛, . . . were listed as examples of the reduction rates. However, the reduction rates employed by the present invention are not limited to these reduction rates. Reduction rates of ½, ⅓, ¼, . . . may be assigned according to the numbers of pixels within the images, for example.

What is claimed is:

1. An image processing method, for extracting edges from digital photographic images and for obtaining edge data that represents the states of the edges, comprising the steps of:
   determining reduction intensities according to the sizes of the digital photographic images, such that the reduction intensities are increased for digital photographic images of greater sizes;
   administering reduction processes on the digital photographic images, employing the determined reduction intensities, to obtain reduced images; and
   extracting the edges, from which the edge data is obtained, from the reduced images;
   analyzing the edge data in order to detect states of blur in the digital photographic images; and
   correcting the detected states of blur in the digital photographic images.

2. An image processing method, for extracting edges from digital photographic images and for obtaining edge data that represents the states of the edges, comprising the steps of:
   administering reduction processes on the digital photographic images employing a plurality of different reduction intensities, which are incremented in a stepwise manner, to obtain a plurality of first reduced images corresponding to each of the plurality of reduction intensities;
   extracting edges from each of the first reduced images;
   obtaining the total number of extracted edges from each of the reduced images;
   determining at which reduction intensity the total number of edges extracted from the reduced images suddenly decreases, compared to that of a reduced image which was reduced at a reduction intensity of the preceding stepwise increment;
   designating either the reduction intensity of the reduced image, in which the total number of extracted edges suddenly decreases, or the reduction intensity of the reduced image, which was reduced at the reduction intensity of the preceding stepwise increment, as a target reduction intensity;
   administering a reduction process on the digital photographic images employing the target reduction intensity, to obtain second reduced images; and
   extracting the edges, from which the edge data is obtained, from the second reduced images.

3. An image processing method, for extracting edges from digital photographic images and for obtaining edge data that represents the states of the edges, comprising the steps of:
   determining scanning intervals, for extracting edges from the digital photographic images, according to the sizes of the digital photographic images, such that the scanning intervals are increased for digital photographic images of greater sizes;
   extracting the edges, from which the edge data is obtained, from the digital photographic images, employing the determined scanning intervals;
   analyzing The edge data in order to detect states of blur in the digital photographic images; and
   correcting the detected states of blur in the digital photographic images.

4. An image processing method, for extracting edges from digital photographic images and for obtaining edge data that represents the states of the edges, comprising the steps of:
   extracting edges from the digital photographic images, employing a predetermined preliminary scanning interval;
   obtaining the total number of extracted edges from each of the digital photographic images;
   determining final scanning intervals, for extracting edges from the digital photographic images, according to the total numbers, such that the final scanning intervals are increased for digital photographic images having greater total numbers of extracted edges; and
   extracting the edges, from which the edge data is obtained, from the digital photographic images, employing the determined final scanning intervals.

5. An image processing method, for extracting edges from digital photographic images and for obtaining edge data that represents the states of the edges, comprising the steps of:
   sequentially extracting edges, from which the edge data is obtained, from ordered portions of the digital photographic images;
   calculating a running total of the number of extracted edges;
   ceasing extraction of edges when the running total of the number of extracted edges reaches a predetermined threshold value;
   analyzing the edge data in order to detect states of blur in the digital photographic images; and
   correcting the detected states of blur in the digital photographic images.

6. An image processing apparatus, for extracting edges from digital photographic images and for obtaining edge data that represents the states of the edges, comprising:
   a reduction intensity determining unit configured to determine reduction intensities according to the sizes of the digital photographic images, such that the reduction intensities are increased for digital photographic images of greater sizes;
   a reducing unit configured to administer reduction processes on the digital photographic images, and employ the determined reduction intensities, to obtain reduced images; and
   an extracting unit configured to extract the edges, from which the edge data is obtained, from the reduced images;
   an analyzing unit configured to analyze the edge data in order to detect states of blur in the digital photographic images; and
   a correction executing unit configured to correct the detected states of blur in the digital photographic images.

7. An image processing apparatus, for extracting edges from digital photographic images and for obtaining edge data that represents the states of the edges, comprising:

stepwise reducing units configured to administer reduction processes on the digital photographic images employing a plurality of different reduction intensities, which are incremented in a stepwise manner, to obtain a plurality of first reduced images corresponding to each of the plurality of reduction intensities;

an edge extracting unit configured to extract edges from each of the first reduced images; and an edge obtaining unit configured to:
  obtain the total number of extracted edges from each of the reduced images,
  determine at which reduction intensity the total number of edges extracted from the reduced images suddenly decreases, compared to that of a reduced image which was reduced at a reduction intensity of the preceding stepwise increment, and
  designate either the reduction intensity of the reduced image, in which the total number of extracted edges suddenly decreases, or the reduction intensity of the reduced image, which was reduced at the reduction intensity of the preceding stepwise increment, as a target reduction intensity, wherein the image processing apparatus administers a reduction process on the digital photographic images employing the target reduction intensity, to obtain second reduced images; and extracts the edges, from which the edge data is obtained, from the second reduced images.

8. An image processing apparatus, for extracting edges from digital photographic images and for obtaining edge data that represents the states of the edges, comprising:

a scanning interval, determining unit configured to determine scanning intervals, for extracting edges from the digital photographic images, according to the sizes of the digital photographic images, such that the scanning intervals are increased for digital photographic images of greater sizes;

an edge extracting unit configured to extract the edges, from which the edge data is obtained, from the digital photographic images, employing the determined scanning intervals;

an analyzing unit configured to analyze the edge data in order to detect states of blur in the digital photographic images; and a correction executing unit configured to correct the detected states of blur in the digital photographic images.

9. An image processing apparatus, for extracting edges from digital photographic images and for obtaining edge data that represents the states of the edges, comprising:

an edge pre-extracting unit configured to extract edges from the digital photographic images, employing a predetermined preliminary scanning interval;

a final scanning interval determining unit configured to obtain the total number of edges, extracted from each of the digital photographic images by the edge pre-extracting means; and for determining final scanning intervals, for extracting edges from the digital photographic images, according to the total numbers, such that the final scanning intervals are increased for digital photographic images having greater total numbers of extracted edges; and an edge extracting unit configured to extract the edges, from which the edge data is obtained, from the digital photographic images, employing the determined final scanning intervals.

10. An image processing apparatus, for extracting edges from digital photographic images and for obtaining edge data that represents the states of the edges, comprising:

an edge extracting unit configured to sequentially extract edges, from which the edge data is obtained, from ordered portions of the digital photographic images;

a stopping unit configured to calculate a running total of the number of extracted edges; and for stopping extraction of edges when the running total of the number of extracted edges reaches a predetermined threshold value;

an analyzing unit configured to analyze the edge data in order to detect states of blur in the digital photographic images; and a correction executing unit configured to correct the detected states of blur in the digital photographic images.

11. A computer program embodied on a computer-readable medium, the computer program including instructions which are executable by a computer to perform an image processing method, for extracting edges from digital photographic images and for obtaining edge data that represents the states of the edges, comprising the procedures of:

determining reduction intensities according to the sizes of the digital photographic images, such that the reduction intensities are increased for digital photographic images of greater sizes;

administering reduction processes on the digital photographic images, employing the determined reduction intensities, to obtain reduced images;

extracting the edges, from which the edge data is obtained, from the reduced images;

analyzing the edge data in order to detect states of blur in the digital photographic images; and correcting the detected states of blur in the digital photographic images.

12. A computer program embodied on a computer-readable medium, the computer program including instructions which are executable by a computer to perform an image processing method, for extracting edges from digital photographic images and for obtaining edge data that represents the states of the edges, comprising the procedures of:

administering reduction processes on the digital photographic images employing a plurality of different reduction intensities, which are incremented in a stepwise manner, to obtain a plurality of first reduced images corresponding to each of the plurality of reduction intensities;

extracting edges from each of the first reduced images;

obtaining the total number of extracted edges from each of the reduced images;

determining at which reduction intensity the total number of edges extracted from the reduced images suddenly decreases, compared to that of a reduced image which was reduced at a reduction intensity of the preceding stepwise increment;

designating either the reduction intensity of the reduced image, in which the total number of extracted edges suddenly decreases, or the reduction intensity of the reduced image, which was reduced at the reduction intensity of the preceding stepwise increment, as a target reduction intensity;

administering a reduction process on the digital photographic images employing the target reduction intensity, to obtain second reduced images; and extracting the edges, from which the edge data is obtained, from the second reduced images.

13. A computer program embodied on a computer-readable medium, the computer program including instructions which are executable by a computer to perform an image processing method, for extracting edges from digital photographic images and for obtaining edge data that represents the states of the edges, comprising the procedures of:

determining scanning intervals, for extracting edges from the digital photographic images, according to the sizes of the digital photographic images, such that the scanning intervals are increased for digital photographic images of greater sizes;

extracting the edges, from which the edge data is obtained, from the digital photographic images, employing the determined scanning intervals;

analyzing the edge data in order to detect states of blur in the digital photographic images; and correcting the detected states of blur in the digital photographic images.

14. A computer program embodied on a computer-readable medium, the computer program including instructions which are executable by a computer to perform an image processing method, for extracting edges from digital photographic images and for obtaining edge data that represents the states of the edges, comprising the steps of:

extracting edges from the digital photographic images, employing a predetermined preliminary scanning interval;

obtaining the total number of extracted edges from each of the digital photographic images;

determining final scanning intervals, for extracting edges from the digital photographic images, according to the total numbers, such that the final scanning intervals are increased for digital photographic images having greater total numbers of extracted edges; and extracting the edges, from which the edge data is obtained, from the digital photographic images, employing the determined final scanning intervals.

15. A computer program embodied on a computer-readable medium, the computer program including instructions which are executable by a computer to perform an image processing method, for extracting edges from digital photographic images and for obtaining edge data that represents the states of the edges, comprising the steps of:

sequentially extracting edges, from which the edge data is obtained, from ordered portions of the digital photographic images;

calculating a running total of the number of extracted edges;

ceasing extraction of edges when the running total of the number of extracted edges reaches a predetermined threshold value;

analyzing the edge data in order to detect states of blur in the digital photographic images; and correcting the detected states of blur in the digital photographic images.

16. An image processing method, for extracting edges from digital photographic images and for obtaining edge data that represents the states of the edges, comprising the steps of:

determining reduction intensities according to the sizes of the digital photographic images, such that the reduction intensities are increased for digital photographic images of greater sizes;

administering reduction processes on portions of the digital photographic images, employing the determined reduction intensities, to obtain reduced images;

extracting the edges, from which the edge data is obtained, from the reduced images;

analyzing the edge data in order to detect states of blur in the digital photographic images; and correcting the detected states of blur in the digital photographic images.

17. An image processing method as defined in claim 16, wherein:

the portions of the digital photographic images are those that include at least one specific object therein.

18. An image processing method as defined in claim 16, wherein:

the portions of the digital photographic images are the central portions of the digital photographic images.

19. An image processing method, for extracting edges from digital photographic images and for obtaining edge data that represents the states of the edges, comprising the steps of:

administering reduction processes on portions of the digital photographic images employing a plurality of different reduction intensities, which we incremented in a stepwise manner, to obtain a plurality of first reduced images corresponding to each of the plurality of reduction intensities;

extracting edges from each of the first reduced images;

obtaining the total number of extracted edges from each of the reduced images;

determining at which reduction intensity the total number of edges extracted from the reduced images suddenly decreases, compared to that of a reduced image which was reduced at a reduction intensity of the preceding stepwise increment;

designating either the reduction intensity of the reduced image, in which the total number of extracted edges suddenly decreases, or the reduction intensity of the reduced image, which was reduced at the reduction intensity of the preceding stepwise increment, as a target reduction intensity;

administering a reduction process on the digital photographic images, or on the portions of the digital photographic images employing the target reduction intensity, to obtain second reduced images; and extracting the edges, from which the edge data is obtained, from the second reduced images.

20. An image processing method as defined in claim 19, wherein:

the portions of the digital photographic images are those that include at least one specific object therein.

21. An image processing method as defined in claim 19, wherein:

the portions of the digital photographic images are the central portions of the digital photographic images.

22. An image processing apparatus, for extracting edges from digital photographic images and for obtaining edge data that represents the states of the edges, comprising:

a reduction intensity determining unit configured to determine reduction intensities according to the sizes of the digital photographic images, such that the reduction intensities are increased for digital photographic images of greater sizes;

a reducing unit configured to administer reduction processes on portions of the digital photographic images, employing the determined reduction intensities, to obtain reduced images;

an extracting unit configured to extract the edges, from which the edge data is obtained, from the reduced images;

an analyzing unit configured to analyze the edge data in order to detect states of blur in the digital photographic images; and a correction executing unit configured to correct the detected states of blur in the digital photographic images.

23. An image processing apparatus as defined in claim 22, wherein:
the portions of the digital photographic images are those that include at least one specific object therein.

24. An image processing apparatus as defined in claim 22, wherein:
the portions of the digital photographic images are the central portions of the digital photographic images.

25. An image processing apparatus, for extracting edges from digital photographic images and for obtaining edge data that represents the states of the edges, comprising:
stepwise reducing units configured to administer reduction processes on portions of the digital photographic images employing a plurality of different reduction intensities, which are incremented in a stepwise manner, to obtain a plurality of first reduced images corresponding to each of the plurality of reduction intensities;
an edge extracting unit configured to extract edges from each of the first reduced images; and
an edge obtaining unit configured to:
obtain the total number of extracted edges from each of the reduced images,
determine at which reduction intensity the total number of edges extracted from the reduced images suddenly decreases, compared to that of a reduced image which was reduced at a reduction intensity of the preceding stepwise increment, and
designate either the reduction intensity of the reduced image, in which the total number of extracted edges suddenly decreases, or the reduction intensity of the reduced image, which was reduced at the reduction intensity of the preceding stepwise increment, as a target reduction intensity,
wherein the image processing apparatus administers a reduction process on the digital photographic images, or on the portions of the digital photographic images employing the target reduction intensity, to obtain second reduced images; and extracts the edges, from which the edge data is obtained, from the second reduced images.

26. An image processing apparatus as defined in claim 25, wherein:
the portions of the digital photographic images are those that include at least one specific object therein.

27. An image processing apparatus as defined in claim 25, wherein:
the portions of the digital photographic images are the central portions of the digital photographic images.

28. A computer program embodied on a computer-readable medium, the computer program including instructions which are executable by a computer to perform an image processing method, for extracting edges from digital photographic images and for obtaining edge data that represents the states of the edges, comprising the procedures of:
determining reduction intensities according to the sizes of the digital photographic images, such that the reduction intensities are increased for digital photographic images of greater sizes;
administering reduction processes on portions of the digital photographic images, employing the determined reduction intensities, to obtain reduced images;
extracting the edges, from which the edge data is obtained, from the reduced images;
analyzing the edge data in order to detect states of blur in the digital photographic images; and
correcting the detected states of blur in the digital photographic images.

29. A computer program as defined in claim 28, wherein:
the portions of the digital photographic images are those that include at least one specific object therein.

30. A computer program as defined in claim 28, wherein:
the portions of the digital photographic images are the central portions of the digital photographic images.

31. A computer program embodied on a computer-readable medium, the computer program including instructions which are executable by a computer to perform an image processing method, for extracting edges from digital photographic images and for obtaining edge data that represents the states of the edges, comprising the procedures of:
administering reduction processes on portions of the digital photographic images employing a plurality of different reduction intensities, which are incremented in a stepwise manner, to obtain a plurality of first reduced images corresponding to each of the plurality of reduction intensities;
extracting edges from each of the first reduced images;
obtaining the total number of extracted edges from each of the reduced images;
determining at which reduction intensity the total number of edges extracted from the reduced images suddenly decreases, compared to that of a reduced image which was reduced at a reduction intensity of the preceding stepwise increment;
designating either the reduction intensity of the reduced image, in which the total number of extracted edges suddenly decreases, or the reduction intensity of the reduced image, which was reduced at the reduction intensity of the preceding stepwise increment, as a target reduction intensity;
administering a reduction process on the digital photographic images, or on the portions of the digital photographic images employing the target reduction intensity, to obtain second reduced images; and
extracting the edges, from which the edge data is obtained, from the second reduced images.

32. A computer program as defined in claim 31, wherein:
the portions of the digital photographic images are those that include at least one specific object therein.

33. A computer program as defined in claim 31, wherein:
the portions of the digital photographic images are the central portions of the digital photographic images.

* * * * *